(12) United States Patent
Koduri et al.

(10) Patent No.: US 9,292,935 B2
(45) Date of Patent: Mar. 22, 2016

(54) SENSOR-BASED EVALUATION AND FEEDBACK OF EXERCISE PERFORMANCE

(71) Applicant: ZSOLUTIONZ, LLC, Sammamish, WA (US)

(72) Inventors: Sunil Koduri, Sammamish, WA (US); Bobby Joe Adams, Kirkland, WA (US); Surendra P. S. Bhatia, Kent, WA (US); John Michael Hand, Sammamish, WA (US); Shalini Koduri, Sammamish, WA (US); John W. Ransone, Wimberley, TX (US)

(73) Assignee: Zsolutionz, LLC, Sammamish, WA (US)

( * ) Notice: Subject to any disclaimer, the term of this patent is extended or adjusted under 35 U.S.C. 154(b) by 0 days.

(21) Appl. No.: 14/588,289

(22) Filed: Dec. 31, 2014

(65) Prior Publication Data

US 2015/0196804 A1    Jul. 16, 2015

Related U.S. Application Data

(60) Provisional application No. 61/927,379, filed on Jan. 14, 2014.

(51) Int. Cl.
*A63B 24/00* (2006.01)
*G06T 7/20* (2006.01)
*G06K 9/00* (2006.01)

(52) U.S. Cl.
CPC .............. *G06T 7/20* (2013.01); *G06K 9/00342* (2013.01)

(58) Field of Classification Search
CPC ....... A63B 24/00; G06T 7/20; G06K 9/00342
See application file for complete search history.

(56) References Cited

U.S. PATENT DOCUMENTS

| D296,385 S | 6/1988 | Lenihan |
| D348,356 S | 7/1994 | Nemoto |

(Continued)

FOREIGN PATENT DOCUMENTS

| EP | 0569879 A2 | 11/1993 |
| EP | 1758040 | 2/2007 |

(Continued)

OTHER PUBLICATIONS

Bauknecht, "We test it—The New Precor Adaptive Motion Trainer", Northwest Runner, Oct. 2013, pp. 14-15.

(Continued)

*Primary Examiner* — Glenn Richman
(74) *Attorney, Agent, or Firm* — Lee & Hayes, PLLC

(57) ABSTRACT

Disclosed herein are techniques and systems for evaluating exercise performance of a user by utilizing one or more intelligent sensors, including at least one camera-based sensor configured to detect image data of the user. The at least one camera-based sensor may be mounted on any suitable structure, including a stationary exercise device. A system including the camera-based sensor may further comprise a performance assessment module stored in memory and executable by one or more processors to determine an exercise performance condition of the user based at least in part on the detected image data. An output module may output an evaluation of the exercise performance condition or an instruction to take corrective action. The fitness machine may thereby provide real-time, constructive feedback regarding the user's exercise performance based on the sensed data and utilizing fuzzy logic and other forms of intelligent software.

27 Claims, 9 Drawing Sheets

(56) References Cited

U.S. PATENT DOCUMENTS

| | | |
|---|---|---|
| D350,135 S | 8/1994 | Polk, Jr. et al. |
| 5,368,532 A | 11/1994 | Farnet |
| 5,527,239 A | 6/1996 | Abbondanza |
| 5,810,747 A | 9/1998 | Brudny et al. |
| 5,947,868 A | 9/1999 | Dugan |
| 6,126,572 A | 10/2000 | Smith |
| 6,152,856 A | 11/2000 | Studor et al. |
| D470,785 S | 2/2003 | Vermillion |
| 6,605,038 B1 | 8/2003 | Teller et al. |
| D531,989 S | 11/2006 | Dayan |
| D542,959 S | 5/2007 | Yao |
| 7,359,121 B2 | 4/2008 | French et al. |
| D584,843 S | 1/2009 | Kosche |
| D593,426 S | 6/2009 | Huang et al. |
| D619,485 S | 7/2010 | Ikeda et al. |
| D629,549 S | 12/2010 | Feigenbaum |
| 7,914,420 B2 | 3/2011 | Daly et al. |
| D636,769 S | 4/2011 | Wood et al. |
| D637,751 S | 5/2011 | Chiu |
| 8,007,405 B2 | 8/2011 | Burnfield et al. |
| D650,357 S | 12/2011 | Chen |
| 8,152,695 B2 | 4/2012 | Riley et al. |
| 8,235,724 B2 | 8/2012 | Gilley et al. |
| D678,271 S | 3/2013 | Chiu |
| D684,968 S | 6/2013 | Smith et al. |
| 8,537,568 B2 | 9/2013 | Tang |
| D693,325 S | 11/2013 | Lee |
| 8,597,142 B2 | 12/2013 | Mayles et al. |
| 8,620,146 B1 | 12/2013 | Coleman |
| D702,206 S | 4/2014 | Kim et al. |
| D702,232 S | 4/2014 | Choi |
| D705,777 S | 5/2014 | Groene et al. |
| D706,773 S | 6/2014 | Lu |
| D710,349 S | 8/2014 | Han et al. |
| D711,258 S | 8/2014 | Jacobs et al. |
| D711,871 S | 8/2014 | Daniel |
| 8,803,888 B2 | 8/2014 | Buban |
| D712,400 S | 9/2014 | Kim et al. |
| D712,855 S | 9/2014 | Thompson et al. |
| D712,899 S | 9/2014 | Park et al. |
| D712,946 S | 9/2014 | Hong |
| D714,746 S | 10/2014 | Euiseok et al. |
| D714,782 S | 10/2014 | Ohshima |
| D715,795 S | 10/2014 | McManigal |
| D716,265 S | 10/2014 | Park et al. |
| D716,293 S | 10/2014 | Hwang et al. |
| D716,799 S | 11/2014 | Green et al. |
| D718,303 S | 11/2014 | Choteau et al. |
| D720,334 S | 12/2014 | Wang |
| 2002/0055418 A1 | 5/2002 | Pyles et al. |
| 2003/0109322 A1 | 6/2003 | Funk et al. |
| 2004/0102931 A1 | 5/2004 | Ellis et al. |
| 2005/0039541 A1 | 2/2005 | Kurono |
| 2005/0070809 A1 | 3/2005 | Acres |
| 2005/0272561 A1 | 12/2005 | Cammerata |
| 2007/0123389 A1 | 5/2007 | Martin |
| 2007/0232452 A1 | 10/2007 | Hanoun |
| 2008/0300521 A1 | 12/2008 | Karkanias et al. |
| 2008/0300914 A1 | 12/2008 | Karkanias et al. |
| 2009/0069156 A1 | 3/2009 | Kurunmaki et al. |
| 2009/0156363 A1 | 6/2009 | Guidi et al. |
| 2010/0280416 A1 | 11/2010 | Hyde et al. |
| 2010/0323846 A1 | 12/2010 | Komatsu et al. |
| 2011/0016120 A1 | 1/2011 | Haughay, Jr. et al. |
| 2011/0172060 A1 | 7/2011 | Morales et al. |
| 2011/0201476 A1 | 8/2011 | Solomon |
| 2012/0109013 A1 | 5/2012 | Everett et al. |
| 2012/0122529 A1 | 5/2012 | Lyons |
| 2012/0139727 A1 | 6/2012 | Houvener et al. |
| 2012/0183939 A1 | 7/2012 | Aragones et al. |
| 2012/0220428 A1 | 8/2012 | Carlson |
| 2012/0251079 A1 | 10/2012 | Meschter et al. |
| 2012/0299846 A1 | 11/2012 | Matsuda |
| 2012/0310971 A1 | 12/2012 | Tran |
| 2012/0311334 A1 | 12/2012 | Bruestle et al. |
| 2013/0024408 A1 | 1/2013 | Firminger et al. |
| 2013/0090749 A1 | 4/2013 | Oswald et al. |
| 2013/0144411 A1 | 6/2013 | Savarese et al. |
| 2013/0178960 A1 | 7/2013 | Sheehan et al. |
| 2013/0225370 A1 | 8/2013 | Flynt et al. |
| 2013/0274066 A1 | 10/2013 | Ashby et al. |
| 2013/0307816 A1 | 11/2013 | Lee et al. |
| 2014/0249429 A1 | 9/2014 | Tran |
| 2014/0309082 A1 | 10/2014 | Iglehart |
| 2015/0196805 A1 | 7/2015 | Koduri et al. |
| 2015/0199494 A1 | 7/2015 | Koduri et al. |

FOREIGN PATENT DOCUMENTS

| | | |
|---|---|---|
| EP | 1978497 | 10/2008 |
| WO | WO9421171 A1 | 9/1994 |
| WO | WO2008007856 A1 | 1/2008 |
| WO | WO2013034987 A2 | 3/2013 |

OTHER PUBLICATIONS

Mulrooney, "How to Use My Polar Heart Rate Monitor With Life Fitness Equipment", retrieved from http://www.livestrong.com/article/223981-how-to-use-my-polar-heart-rate-monitor-with-life-fitness-equipment/>>, Sep. 2, 2010, 7 pages.

Octane Fitness, "Pro4700 Operations Manual", retrieved on Oct. 21, 2013 from >>http://www.octanefitness.com/files/octane/filemgmt/files/pro4700-operations-manual-.pdf>>, 24 pages.

Ursu, "10-Step Guide: How to Use the Weigh Loss Preset Treadmill Workouts", retreived on Dec. 19, 2013 from <<http://www.performbetter.com/webapp/wcs/stores/servlet/PBOnePieceView?storeId=10151&pagename=283>>, 3 pages.

Waters, "Benefits of Training With Heart Rate Control", retreieved on Dec. 19, 2013 from <<www.smoothfitness.com/fitness-center/articles/training-with-heart-rate-control.htm>>, Smooth Fitness, 2 pages.

Office Action for U.S. Appl. No. 29/479,299, mailed on Jan. 7, 2015, Sunil Koduri, "Fitness Machine User Interface", 7 pages.

PCT Search Report and Written Opinion mailed Apr. 24, 2015 for PCT application No. PCT/US2014/072857, 9 pages.

PCT Search Report and Written Opinion mailed May 11, 2015 for PCT Application No. PCT/US14/72854, 15 Pages.

PCT Search Report and Written Opinion mailed Apr. 24, 2015 for PCT application No. PCT/US2014/072849, 12 pages.

Shu, et al., "In-Shoe Plantar Pressure Measurement and Analysis System Based on Fabric Pressure Sensing Array", retrieved from <<http://repository.lib.polyu.edu.hk/jspui/bitstream/10397/2527/1/05378500.pdf>>, IEEE Transactions on Information Technology in Biomedicine, vol. 14, No. 3, May 2010, 9 pages.

Office Action for U.S. Appl. No. 14/588,346, mailed on Oct. 16, 2015, Sunil Koduri, "Fuzzy Logic-Based Evaluation and Feedback of Exercise Performance", 9 pages.

Office Action for U.S. Appl. No. 14/588,361, mailed on Aug. 17, 2015, Sunil Koduri, "Cloud-Based Initiation of Customized Exercise Routine", 8 pages.

SENSOR-BASED EVALUATION AND FEEDBACK OF EXERCISE PERFORMANCE

CROSS REFERENCE TO RELATED APPLICATIONS

This application is based on and claims priority to U.S. Provisional Application No. 61/927,379, filed on Jan. 14, 2014, entitled, "SENSOR-BASED EVALUATION AND FEEDBACK OF EXERCISE PERFORMANCE," the contents of which are herein incorporated by reference.

BACKGROUND

Exercise is necessary to maintain both physical and mental health. Although many people prefer exercising outdoors, it is often difficult to do so due to potentially adverse weather conditions and/or unsuitable urban environments. Accordingly, many individuals have taken to exercising indoors in places such as at health clubs, gyms, or even their own home (e.g., a room or garage) where environmental conditions are controllable and predictable. In these settings, weight lifting equipment may be used to improve one's muscular strength, while fitness machines (e.g., treadmills, elliptical machines, stationary bicycles, etc.) may be used for cardiovascular exercise.

Despite the advantages provided by fitness machines, today's fitness machines are limited in what they can do for a user. For example, fitness machines are predominantly "manual" in design. Namely, each time a user begins a workout on a fitness machine, he/she typically provides input data (e.g., weight, age, etc.), and selects a workout program or routine from multiple available routines (e.g., steady pace, interval training, hills, etc.). The available workout routines are often poorly tailored to the specific user of the fitness machine, making it more difficult for users to achieve fitness-related goals given the limited, manual input available on the fitness machine.

Current fitness machines are further limited in the feedback they can provide to the user. That is, any performance-related feedback provided by the fitness machine is generally limited to basic vital information (e.g., heart rate information) of the user. In such a scenario, a user is left to decide for themselves whether he/she should adjust the intensity (e.g., resistance, speed, etc.) of the workout program in an effort to achieve a target heart rate. Moreover, sensing mechanisms are limited to metal handgrips and heart monitoring chest straps configured to measure heart rate and other limited health measurements.

Furthermore, using fitness machines can also be rather boring and monotonous due to the unchanging scenery of most indoor environments. To cure this boredom, users typically listen to music or watch video media while exercising on a fitness machine. However, the novelty of such passive media can eventually wear off, leading to continued boredom while exercising on a fitness machine.

SUMMARY

Described herein are techniques and systems for evaluating exercise performance of a user by utilizing one or more intelligent sensors, including at least one camera-based sensor that detects image data of the user. A system integrating one or more intelligent sensors as disclosed herein transforms any suitable environment into a "smart" fitness system that is able to collect image data and other inputs about a user in order to evaluate the user's exercise performance in real-time, and to provide constructive feedback regarding the user's exercise performance. The system described herein may obtain fitness information in a fitness knowledge store that is utilized with fuzzy logic to enable numerous applications, including, but not limited to, evaluation of a user's exercise performance.

In some embodiments, a system includes at least one camera-based sensor to detect image data of a user during an exercise routine. The system further includes one or more processors and one or more memories storing modules executable by the one or more processors, the modules comprising: a performance assessment module to determine an exercise performance condition of the user based at least in part on the detected image data, and an output module to output an evaluation of the exercise performance condition or an instruction to take corrective action.

In some embodiments, a process of evaluating an exercise performance condition of a user includes detecting image data of the user, and determining an exercise performance condition of the user based at least in part on the detected image data. The exercise performance condition may be evaluated so that an evaluation of the exercise performance condition or an instruction to take corrective action may be provided to the user.

The smart fitness system of the embodiments disclosed herein leverages one or more intelligent sensors, fitness information, fuzzy logic, and similar technology to enable automation of many of the manual processes plaguing current fitness machines, and prescribe workout regimens for any exercise environment that are tailored to specific users' information and goals. During exercise routines, real-time, constructive feedback may be provided to the users based on sensed data, including image data, about the user. In this manner, the fitness system becomes something of a "virtual coach" to the user to help make exercising safer, more interactive, and fun. Moreover, the fitness machine may help achieve results and goals of the user faster.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicates similar or identical items.

DETAILED DESCRIPTION

Figure 1:
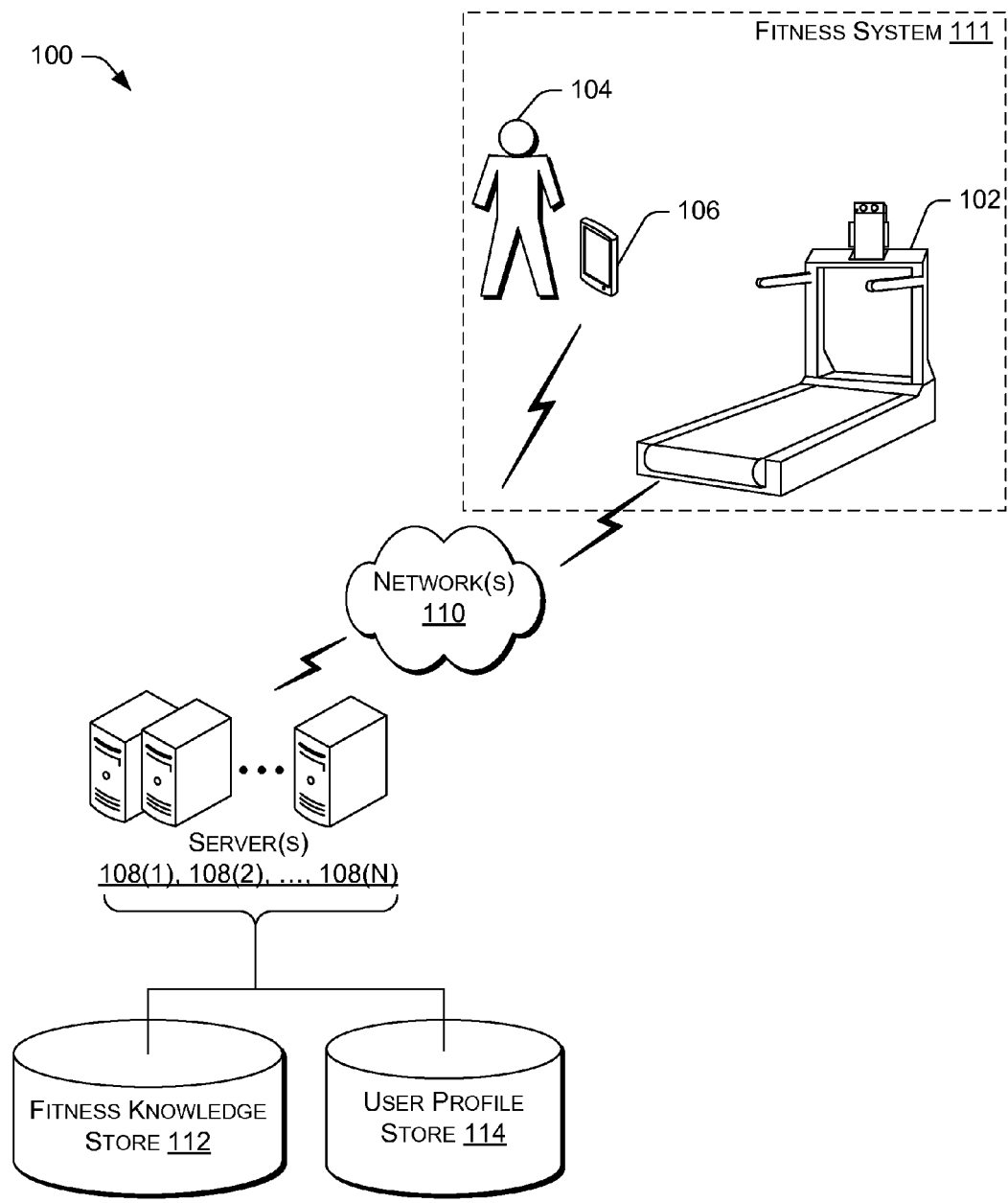
FIG. 1 illustrates an example environment of a cloud-based system (or platform) for implementing a user-customized fitness experience.

Embodiments of the present disclosure are directed to, among other things, techniques and systems for evaluating exercise performance of a user by utilizing one or more intelligent sensors, including at least one camera-based sensor that detects image data of the user. The at least one camera-based sensor, and in some embodiments, one or more additional sensors, may be implemented in any suitable environment. For example, the system disclosed herein may be implemented in a living room or other similar household environment by mounting the camera-based sensor proximate a display (e.g., a television display). As another example, the camera-based sensor, and in some cases other additional sensors, may be mounted on a bicycle, a rowing boat (e.g., canoe, kayak, etc.), or any other similar structure used for exercise and/or recreational activities.

In some embodiments, the system may be implemented on a fitness machine, such as a treadmill. Although the embodiments disclosed herein are often described with reference to a treadmill, other types of stationary exercise devices can be used with the techniques and systems disclosed herein without changing the basic characteristics of the system. Such other types of stationary exercise devices that may make up part of a fitness machine disclosed herein include, but are not limited to, elliptical machines, stationary bicycles, rowing machines, stair climbers, exercise pools (i.e., swimming machines), weight machines, and similar types of devices. Moreover, it is to be appreciated that the embodiments disclosed herein may comprise fitness machines built for cardiovascular exercise, strength exercise (e.g., weight machines), and/or flexibility exercise. The disclosed system may be implemented and used in various environments and settings, including, but not limited to, health clubs or gyms, medical rehabilitation centers, corporate offices, household fitness environments, outdoor environments, and the like.

The embodiments disclosed herein pertain to a system using one or more intelligent sensors to determine and evaluate an exercise performance condition. An "exercise performance condition," as used herein, may relate to any suitable user performance metric, such as body form, stance, exercise pace, stride length, and/or vital information (e.g., heart rate, hydration level, etc.) that may provide a basis for determining how well the user is performing with respect to referenced fitness information. As one illustrative, non-limiting, example, an exercise performance condition may comprise a condition that the user is currently running with an erect torso (as opposed to a lordotic torso). This example exercise performance condition may then be evaluated as "good running form" by accessing information in a fitness knowledge store that indicates running with an erect torso is an element of correct running form. In some embodiments, user interface aspects of the system may be in the form of a virtual assistant or virtual persona that assists the user with his/her workout regimen.

The techniques and systems described herein may be implemented in a number of ways. Example implementations are provided below with reference to the following figures.

Example Environment

FIG. 1 illustrates an example environment of a cloud-based system 100 including, among other things, a fitness machine 102 (sometimes referred to herein as a "smart fitness machine 102"). In the cloud-based system 100, a user(s) 104 is associated with the fitness machine 102 at any given time, such as when the user 104 decides to exercise on the fitness machine 102.

The user 104 may also be associated with a client computing device(s) ("client device") 106 that is configured to communicate via wired or wireless communication with the fitness machine 102, and further to access, or cause the fitness machine 102 to access, one or more servers 108(1), 108(2), . . . , 108(N) via a network(s) 110. For example, the client device 106 may be physically connected to the fitness machine 102 through electrical couplings such as wires, pins, connectors, etc., to utilize a wired communication protocol (e.g., universal serial bus (USB)), or the client device 106 may be wirelessly connected to the fitness machine 102, such as via WiFi protocol, a short-wave radio frequency (e.g., Bluetooth®), or another suitable wireless communication protocol. The client device 106 may further utilize a communication interface to access the server(s) 108(1)-(N) via the network 110. The user 104 may represent various different types of users, such as a user 104 interested in casual fitness, recreational fitness, or a competitive or professional athlete. Such different types of users are discussed in more detail below with reference to user profiles.

In general, the client device 106, and/or the fitness machine 102, and/or certain components of the fitness machine 102 may constitute a networked fitness system 111. The networked fitness system 111 (or any individual device thereof), either automatically or at the direction of the user 104, may access the server(s) 108(1)-(N) via the network 110 to obtain or upload various types of data, and the networked fitness system 111 may also receive messages such as email, short message service (SMS) text messages, messages via an application associated with the client device 106 or the fitness machine 102, and the like, via the network 110. In this sense, the networked fitness system 111 and the server(s) 108(1)-(N) constitute a distributed platform (i.e., a combination of software and hardware components) that provides a complete fitness experience for users (e.g., the user 104) of the platform, and where users can experience a customized fitness program that is tailored to the particular user.

The client device 106 may be implemented as any number of computing devices, including a personal computer, a laptop computer, a tablet computer, a portable digital assistant (PDA), a mobile (smart) phone, fitness trackers (e.g., a Nike® FuelBand®, FitBit® activity trackers or wristbands, etc.), a thumb drive, a key fob, a portable media player, a portable game player, a smart watch, and so forth. The client device 106 and the fitness machine 102 are each equipped with one or more processors and memory to store applications and data. According to some embodiments, a browser application is stored in the respective memories of the client device 106 and the fitness machine 102 and executes on the respective processors to provide access to the server(s) 108(1)-(N). The browser may render web pages served by a site operated by the server(s) 108(1)-(N) on an associated display of the client device 106 and/or the fitness machine 102. Although embodiments are described in the context of a web based system, other types of client/server-based communications and associated application logic could be used in the cloud-based system 100. The network 110 is representative of many different types of networks, such as cable networks, the Internet, local area networks, mobile telephone networks, wide area networks and wireless networks, or a combination of such networks.

The server(s) 108(1)-(N) may be maintained and operated by an entity such as a service provider associated with the fitness machine 102. For example, a service that facilitates cloud-based storage and management of fitness data for users may maintain the server(s) 108(1)-(N) to provide various fitness services to the user 104. For example, the servers(s) 108(1)-(N) may handle requests, such as in the form of a uniform resource locator (URL), from the fitness machine 102 and/or the client device 106, and serve, in response, various information and data, such as in the form of a web page, to the fitness machine 102 and/or the client device 106, allowing the user 104 to interact with the data provided by the server(s) 108(1)-(N). In this manner, an entity maintaining the server(s) 108(1)-(N) is representative of essentially any service provider supporting user interaction with fitness-related data, including health club sites, equipment maker sites, social networking sites, etc.

In some embodiments, the server(s) 108(1)-(N) have access to a fitness knowledge store 112 that is a repository of fitness knowledge information, such as how to walk, run, stretch, bike, row, etc. with proper body form. The fitness knowledge store 112 may also contain information pertaining to preferable levels, and/or ranges, of body mass index (BMI), heart rate, hydration, blood pressure, blood glucose, respiratory rate, temperature, and the like that may be mapped across various activity levels (e.g., moderate vs. intense exercise) and/or demographic information that may include age, gender, race or ethnicity. For instance, health and fitness experts (e.g., sports medicine experts) and other resources may be utilized to populate the fitness knowledge store 112 with information on recommended exercise regimens, including frequency, intensity, and duration of workouts recommended across various user profile types. Such a fitness knowledge store 112 may be leveraged for customization of exercise routines and for providing constructive feedback to specific individuals that is based on known information about the individuals.

In some embodiments, the server(s) 108(1)-(N) also have access to a user profile store 114 that stores information on multiple users, including the user 104 of FIG. 1. The user profile store 114 maintains profiles for individual users based on collected information about the user. The user profiles may associate with the user information including, but not limited to, a username and password, name of the user, mailing address, phone number, electronic mail (e-mail) address, social media accounts and profiles (e.g., Facebook®, Twitter®, etc.), gender (e.g., male or female), date of birth (i.e., age), race or ethnicity, height, weight, health conditions (e.g., heart disease, cancer, previous strokes, respiratory disease, injuries, diabetes, Alzheimer's disease, depression, liver disease, kidney disease, blood pressure, etc.).

The user 104 may provide fitness goals or objectives as part of an initial profile setup to be stored in the user profile store 114. For example, categories such as "lose weight", "stay fit", "improve endurance", "train for race", or "recover from injury (rehabilitation)" are examples of options that may be provided to a user 104 for selection of a fitness goal. In some embodiments, specific events (e.g., the Boston Marathon) may be specified by the user 104 as a specific goal for training purposes. In this scenario, the fitness machine 102 may be configured to present a virtual course of the specific event during the exercise routine so that the user 104 can simulate the event for training purposes.

In some embodiments, the user 104 may access a site on the server(s) 108(1)-(N) to answer a questionnaire that facilitates automated selection, by the server(s) 108(1)-(N), of a fitness goal. In some embodiments, the user profile store 114 further maintains schedule information for the user 104, such as a schedule that indicates dates and times of upcoming exercise routines according to a prescribed exercise regimen. This schedule may consider an availability of the user 104 based on a personal calendar of the user 104. As such, an exercise regimen may be catered to a user 104 depending on his/her availability. For example, a full-time worker may only have an hour or two each day available for exercise, while a professional athlete who is devoted to training full time may be available to exercise much more frequently (e.g., multiple times throughout a single day and for extended duration).

In some embodiments, users that setup profiles in the user profile store 114 may be categorized according to profile types. This categorization may be based on explicit selection by the user 104, or alternatively, the server(s) 108(1)-(N) may be configured to determine a categorization for users based on information provided by the users, or based on answers to predetermined questions. An illustrative example of possible categories for profile types are: (1) Casual Fitness; (2) Recreational; (3) Competitive; and (4) Physical Therapy. Attributes of the "Casual Fitness" profile type may be users that: would like to lose weight or get in shape, are not serious about running, may be fine with just walking for exercise, are not consistent with an exercise regimen, are unsure about technology, may have medical issues, are not receptive to online training, and are not motivated to train or adjust. Attributes of the "Recreational" profile type may be users that: are casual runners, may be interested in running, may be interested in exercising, are fairly regular with an exercise regimen, are receptive to technology, exercise to aid medical issues, utilize online training, and are easier to train and adjust. Attributes of the "Competitive" profile type may be users that: are active runners, enjoy running, are excited about competing, are consistent in a daily exercise regimen, are very selective in technology, have minimal health issues, seek professional training, and are harder to teach. Attributes of the "Physical Therapy" profile type may be users that: have suffered a physical injury and are using exercise as physical therapy in an effort to rehabilitate and get healthy.

At least some of the information maintained in the user profile store 114 may be received from explicit user input via a user interface of either or both of the client device 106 or the fitness machine 102, while some of the information may include implicit information received via sensors of the fitness machine 102 (e.g., heart rate, weight for BMI calculation, body temperature, etc.), or from other sources, such as other fitness related products that track workout history information (e.g., Nike® FuelBand, FitBit® trackers and wristbands, etc.). With more information obtained from the user 104, a more complete a user profile may be created and stored in the user profile store 114 for use by the fitness machine 102.

Example System Implementation

Figure 2A:
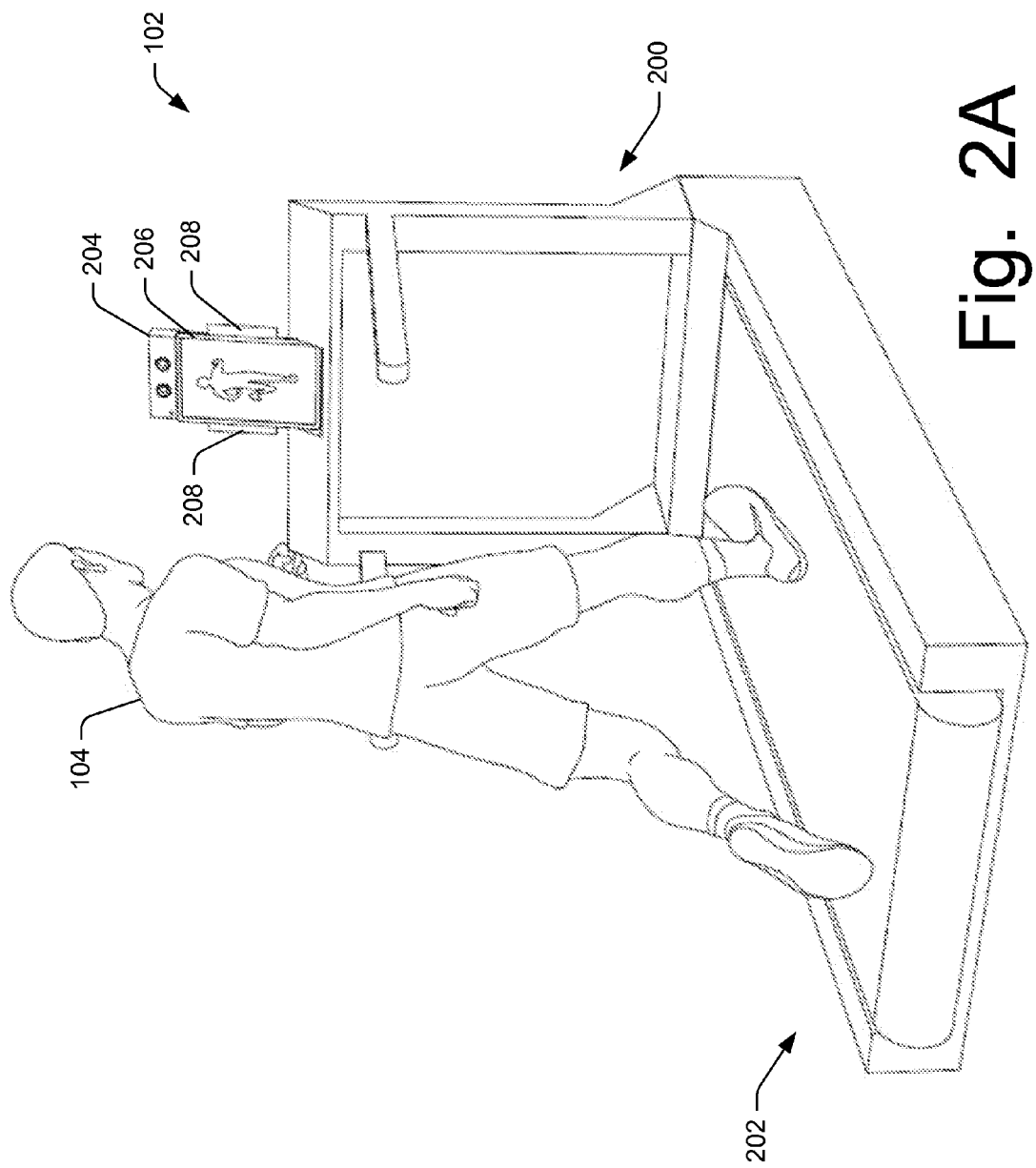
FIG. 2A illustrates a perspective view of the example fitness machine including a camera-based sensor mounted on the fitness machine.

FIG. 2A illustrates a perspective view of the example fitness machine 102 of FIG. 1 as one suitable implementation environment for the systems and techniques disclosed herein. FIG. 2A shows a stationary exercise device of the fitness machine 102 in the form of a treadmill. However, it is to be appreciated that the fitness machine 102 may comprise any suitable stationary exercise device (e.g., a stationary bike, an elliptical machine, a rowing machine, a stair climber, a swimming machine, etc.) without changing the basic characteristics of the system. The fitness machine 102 may comprise a front end 200 and a back end 202. A camera-based sensor 204 may be mounted at any suitable location on the fitness machine 102 and communicatively coupled to the fitness machine 102 via wired or wireless connection. In some embodiments, the camera-based sensor 204 is mounted at the front end 200 of the fitness machine 102, such as above a display 206 that may also be mounted at the front end 200. In general, the display 206 may be located in the line of site of the user 104, while the camera-based sensor 204 may be mounted at any suitable location on, or around, the fitness machine 200. Mounting the camera-based sensor 204 at the front end 200 of the fitness machine 102 allows the camera-based sensor 204 to obtain image data of the user 104 from the front side of the user's body. In some embodiments, the camera-based sensor 204 may be able to detect objects from as close as approximately 2 feet from the camera-based sensor 204 and as far as approximately 14 feet from the camera-based sensor 204. The camera-based sensor 204 may further comprise a viewing angle of approximately 70 degrees.

In some embodiments, the camera-based sensor 204 may be part of the networked fitness system 111 without the fitness machine 102. In such environments, the camera-based sensor 204 may be implemented in a living room, or on other recreational and/or fitness equipment (e.g., a bicycle, rowing boat, etc.), and the camera-based sensor 204 may be mountable to a variety of types of structures to be implemented in those environments. For example, the camera-based sensor 204 may comprise a substantially flat base for setting or mounting the camera-based sensor 204 on a flat surface (e.g., a television display stand, the top of a display, etc.), with or without fasteners (e.g., screws, bolts, etc.) or other type of adhesive or mounting component (e.g., hook-and-loop or Velcro-type fastening elements, etc.). In some embodiments, a mounting structure for the camera-based sensor 204 may include a clip (e.g., spring-loaded clip), ball-and-socket mounting component, or a similar mounting structure that facilitates easy mounting and dismounting of the camera-based sensor 204 onto, or off of, a structure.

The camera-based sensor 204 may comprise a capture device in the form of a depth camera configured to visually monitor the user 104 by collecting image data of the user 104. One suitable example device that may be used as the camera-based sensor 204 is the Kinect® sensor used with the Xbox® console system from Microsoft® Corporation of Redmond, Wash. The camera-based sensor 204 may be configured to continuously detect image data (i.e., capture video) of the user 104 with depth information so that movements of the user 104 may be interpreted by onboard processing units of the camera-based sensor 204 and/or computing components of the fitness machine 102, which will be described in more detail below with reference to FIG. 3. The camera-based sensor 204 may use any suitable technique to capture image data with depth information (e.g., time-of-flight (ToF), structured light imaging, stereo imaging, etc.) to facilitate the techniques described herein. Accordingly, the camera-based sensor 204 may include one or more of a depth camera, a video camera (e.g., red-green-blue (RGB) video camera), stereo cameras, and/or other suitable capture devices using charge-coupled device (CCD) sensors, complementary metal-oxide-semiconductor (CMOS) sensors, and/or infrared (IR) sensors. In some embodiments, the camera-based sensor 204 is configured to emit IR light as a means of ToF imaging.

One illustrative scenario in which movements of the user 104 may be captured by the camera-based sensor 204 and interpreted by the components of the fitness machine 102 is when the user 104 is running on a treadmill that makes up the stationary exercise device portion of the fitness machine 102. For example, exercise performance conditions in the form of running movements of the user 104 may be interpreted in order to determine whether the user 104 is exhibiting proper running form. In order to make such a determination, the fitness machine 102 may downloading in advance, or requesting in real-time, information contained in the fitness knowledge store 112 pertaining to proper running form. That is, the fitness machine 102 may interpret the movements of the user 104 from the image data collected by the camera-based sensor 204 to determine whether the user 104 is running with proper form by comparing an exercise performance condition derived from the image data to reference data obtained from the fitness knowledge store 112. It is to be appreciated that running on a treadmill is but one example scenario of utilizing the camera-based sensor 204 for exercise performance evaluation, and various other types of movements (e.g., walking, stretching, etc.) of the user 104 may be collected by the camera-based sensor 204 and interpreted and utilized for performance evaluation, as will be described in more detail below.

In addition to tracking movements of the user 104 during an exercise routine, the camera-based sensor 204 may be configured for additional uses, such as receiving gestural input commands from the user 104, identifying the user 104 with face recognition techniques, and other similar functions. For example, the server(s) 108(1)-(N) may collect image data of the faces of registered or subscribed users of the cloud-based system 100 of FIG. 1 upon, or after, initial registration with a fitness information service. Accordingly, upon the user 104 positioning himself/herself in front of the camera-based sensor 204, such as at the beginning of an exercise routine, the fitness machine 102 may recognize the user 104 by identifying the face of the user 104 using the camera-based sensor 204.

In some embodiments, the camera-based sensor 204 may be configured to detect a heart rate of the user 104 by detecting changes in skin tone or with other suitable visual cues. For instance, IR or another suitable radiation may be emitted by the camera-based sensor 204 toward the user 104, and an image sensor in the camera-based sensor 204 may detect light that is reflected, and deduce from light that is not reflected that that the non-reflected light has been blocked by blood pulsating through a blood vessel of the user 104. Accordingly, light signals detected at pulsed measurements may correspond to blood flow measurements so that heart rate can be deduced from the light signals detected at the camera-based sensor 204. The camera-based sensor 204 may further be configured to detect facial expressions to interpret emotional states (e.g., happy, worried, sad, etc.) of the user 104. The camera-based sensor 204 may further be configured to detect muscle tension of the user 104 for various muscle groups (e.g., neck, shoulders, hands, etc.) based on suitable visual cues, such a by a flex angle of limbs.

The display 206 of the fitness machine 102 may be any type of display, such as a liquid crystal display (LCD), plasma, electrophoretic, or any other suitable display type. The display 206 may be touch-enabled to allow control by the user 104 of user interface (UI) elements presented on the display 206 using touch, or proximity-based, input. For example, the user 104 may use one or more fingers to provide use single or multi-touch gestural input to the display 206 via a UI presented on the display 206. Touch-enabled displays suitable for use as the display 206 may be based on any suitable touch-based technology, including, but not limited to, capacitive, resistive, surface acoustic wave (SAW), infrared, optical, or any other suitable touch-based technology. The height and width dimensions of the display 206 may be of various sizes and aspect ratios from portrait to landscape configurations. FIG. 2A shows a screen rendering of an example UI on the display 206 that is providing real-time feedback to the user 104 regarding the running form of the user 104, as well as vital information about user 104 (e.g., current heart rate, etc.). In some embodiments, the display 206 may be mounted in a manner to allow the display 206 to swivel vertically and/or horizontally, enabling the user 104 to manipulate the orientation of the display 206 to his/her liking.

In some embodiments, the fitness machine 102 may further include one or more speakers 208 mounted at the front end 200 of the fitness machine 102 to provide audio output to the user 104. Such audio output may comprise music and/or speech synthesized output of the fitness machine 102 to provide performance-based feedback to the user 204, instructions to take corrective action, or general audio output to the user 204 (e.g., sounds, alarms, etc.). An earphone/ear bud jack or plug may further be provided on the fitness machine 102 to allow the user 104 to use ear buds for audio output. Wireless technologies such as Bluetooth® enabled listening devices may also be used with the fitness machine 102. In some embodiments, the fitness machine 102 may enable, through the use of the display 206 and the camera-based sensor 204, a scenario in which user 104 may communicate with another user via an on-line communication protocol such as Voice over Internet Protocol IP (VoIP) in applications such as Skype®, FaceTime®, or something similar technologies.

The fitness machine 102 may include other computing system components to enable the various techniques and processes described herein. Such components may be housed within the enclosure of the display 206, or within another suitable compartment of the fitness machine 102. Example computing system component will be described in further detail with reference to FIG. 3, below.

Figure 2B:
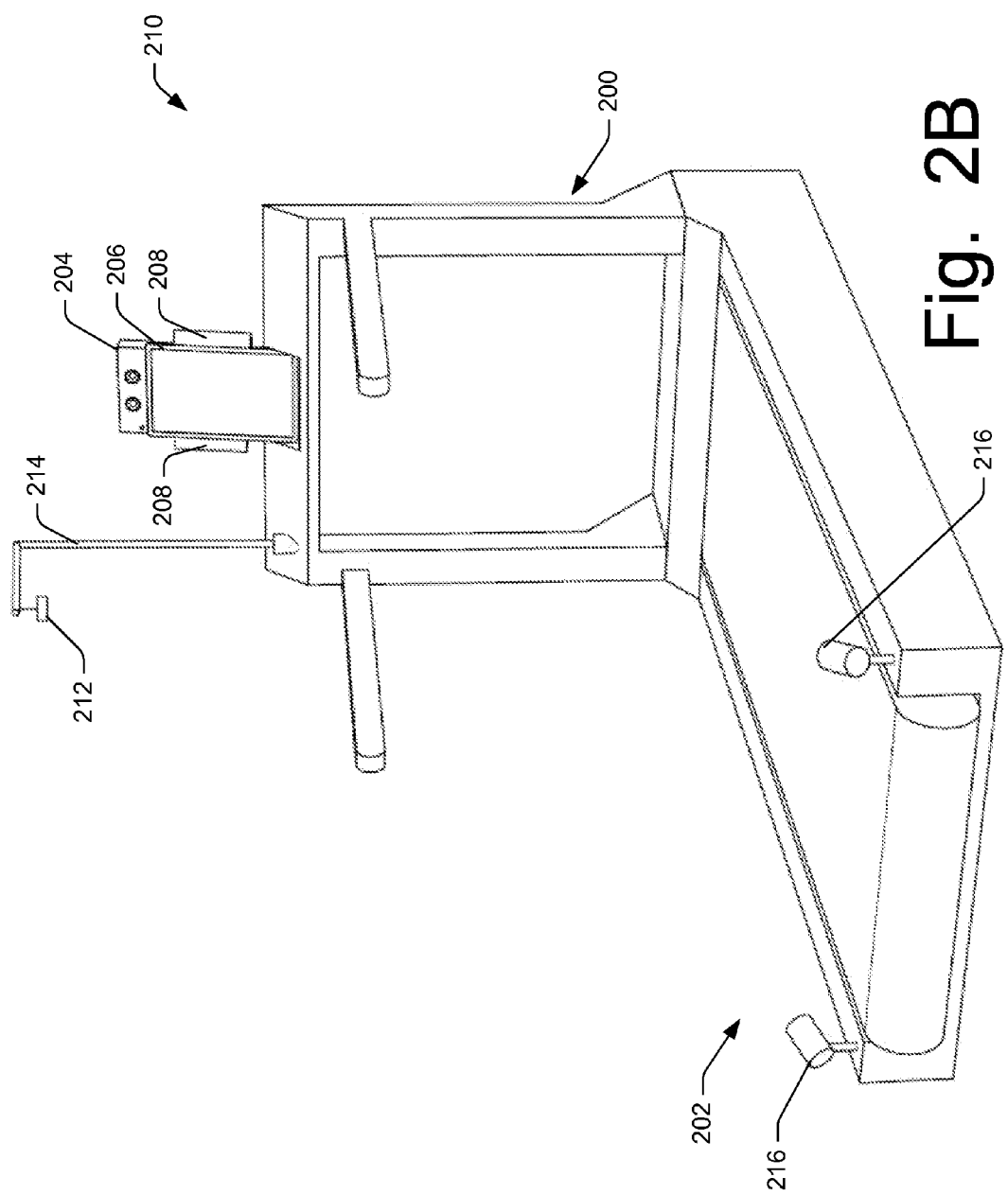
FIG. 2B illustrates a perspective view of an example fitness machine according to another embodiment including a camera-based sensor mounted on the fitness machine, and multiple additional sensors for detecting user information about a user on the fitness machine.

FIG. 2B illustrates a perspective view of an example fitness machine 210 according to another embodiment. The fitness machine 210 may include the camera-based sensor 204 and display 206 of FIG. 2A mounted at the front end 200 of the fitness machine 210, as well as multiple additional sensors. In some embodiments, the additional sensors may include a substantially noninvasive scanning device 212, such as a medical tricorder, configured to take health measurements (vital information) including, but not limited to, heart rate, blood pressure, body temperature, oximetry (blood oxygenation), hydration, heart rate variability (HRV), pulse wave transit time (PWTT) (i.e., a measure of the time it takes for a beat from the user's heart to reach somewhere else in the user's body), and the like. The scanning device 212 may be further configured to run an electrocardiogram (EKG), detect stress levels, and so forth.

The scanning device 212 may be mounted at the front end 200 of the fitness machine 210, such as proximate the display 206 and upon a portion of the fitness machine 210 structure. One example mounting structure 214 is shown in FIG. 2B comprising a stand and retractable cord arrangement so that the user 104 does not have to worry about dropping the scanning device 212 onto the floor if picking up the scanning device 212, which could potentially damage the scanning device 212. In some embodiments, the scanning device 212 may receive vital information about the user 104 in a noninvasive manner, such as by optical-based detection without the need for user intervention.

In other embodiments, the user 104 may grasp the scanning device 212 at any time while on the fitness machine 210, such as before, during, or after exercising on the fitness machine 210, and use the scanning device 212 to collect vital information about the user 104 in a substantially noninvasive manner. For example, the user 104 may pull the scanning device 212 toward them, extending the retractable cord of the mounting structure 214, and contacts his/her forehead with the scanning device 212 in order to measure vital information. In some embodiments, the scanning device 212 may be included as part of a wearable device, such as a smart watch or fitness band to be worn by the user 104. At least a substantially noninvasive technique for taking vital measurements is suitable for use on the fitness machine 210, leaving the user 104 substantially uninterrupted during an exercise routine. It is to be appreciated that the mounting structure 214 is but one example mounting mechanism that may be used with the fitness machine 210, and the scanning device 212 may be mounted on the fitness machine in any suitable manner, such as by inserting the scanning device into a slot or compartment on the fitness machine 210, and so forth.

The fitness machine 210 may further include one or more additional cameras 216 mounted at the back end 202 of the fitness machine 210. The cameras 216 may comprise depth cameras to enable observation of user movements from vantage points that the camera-based sensor 204 may not be able to view (e.g., the entire profile of the user 104). In some embodiments, the cameras 216 may comprise IR-based cameras that are configured to sense IR light for imaging purposes. In some embodiments, the cameras 216 are configured to detect image data of the user 104 which may be processed by downstream components of the fitness machine 210 by utilizing image stitching software to compose a three-dimensional (3D) model of the user 104 based on separate two-dimensional (2D) images obtained from each of the cameras 216. Accordingly, it is to be appreciated that any number of cameras 216 may be utilized with the fitness machine 210, and two cameras 216 are shown merely as an example number of cameras 216 in FIG. 2B that is suitable for the purposes of the embodiments disclosed herein.

More or fewer sensors than those depicted in FIG. 2B may be utilized without changing the basic characteristics of the system. In general, the camera-based sensor 204 and the additional sensors 212 and 216 of the fitness machines 102, 210 are substantially noninvasive in that they do not require blood samples, urine, or anything that may substantially interrupt the user 104 during an exercise routine. In some embodiments, the fitness machine 210 may include additional sensors configured to obtain respiratory rate, blood glucose (e.g., by taking sweat samples of the user 104), and the like. The scanning device 212 and cameras 216 may be communicatively coupled to the fitness machine 210 via wired or wireless (e.g., Bluetooth®) connection in order to transmit collected information about the user 104 to the fitness machine 210 where it may be analyzed and interpreted for various applications.

In some embodiments, the fitness machine 102, 210 may be further configured to receive and process data from external sensors that are provided by the user 104. One example of a user-provided sensor is an electronic textile (e-textile) sensor configured to detect pressure forces on a foot of the user 104 while the user 104 is exercising on the fitness machine 102, 210. A garment of the user 104, such as a sock, may be embedded, or filled, with an e-textile sensor material configured to detect pressure distribution on the foot of the user 104 when walking, running, stretching, and the like. An anklet may be magnetically coupled to corresponding magnetic elements embedded in, or attached to, the sock. The anklet may be configured to receive data from the e-textile sensor material in the sock, and communicate the collected data wirelessly to the fitness machine 102, 210. An example product suitable for use as the e-textile sensor is the Sensoria™ sock from Heapsylon® with a Bluetooth®-enabled anklet. It follows that a pressure map of weight distribution on the foot of the user 104 may be rendered on any suitable display, such as the display 206 of the fitness machine 102, 210, a display of the client device 106, and the like. In addition to pressure data, the e-textile sensor may be configured to register and count discrete steps by the user 104 to enable stride cadence and other useful measurements that may be analyzed to determine exercise performance conditions of the user 104.

Figure 3:
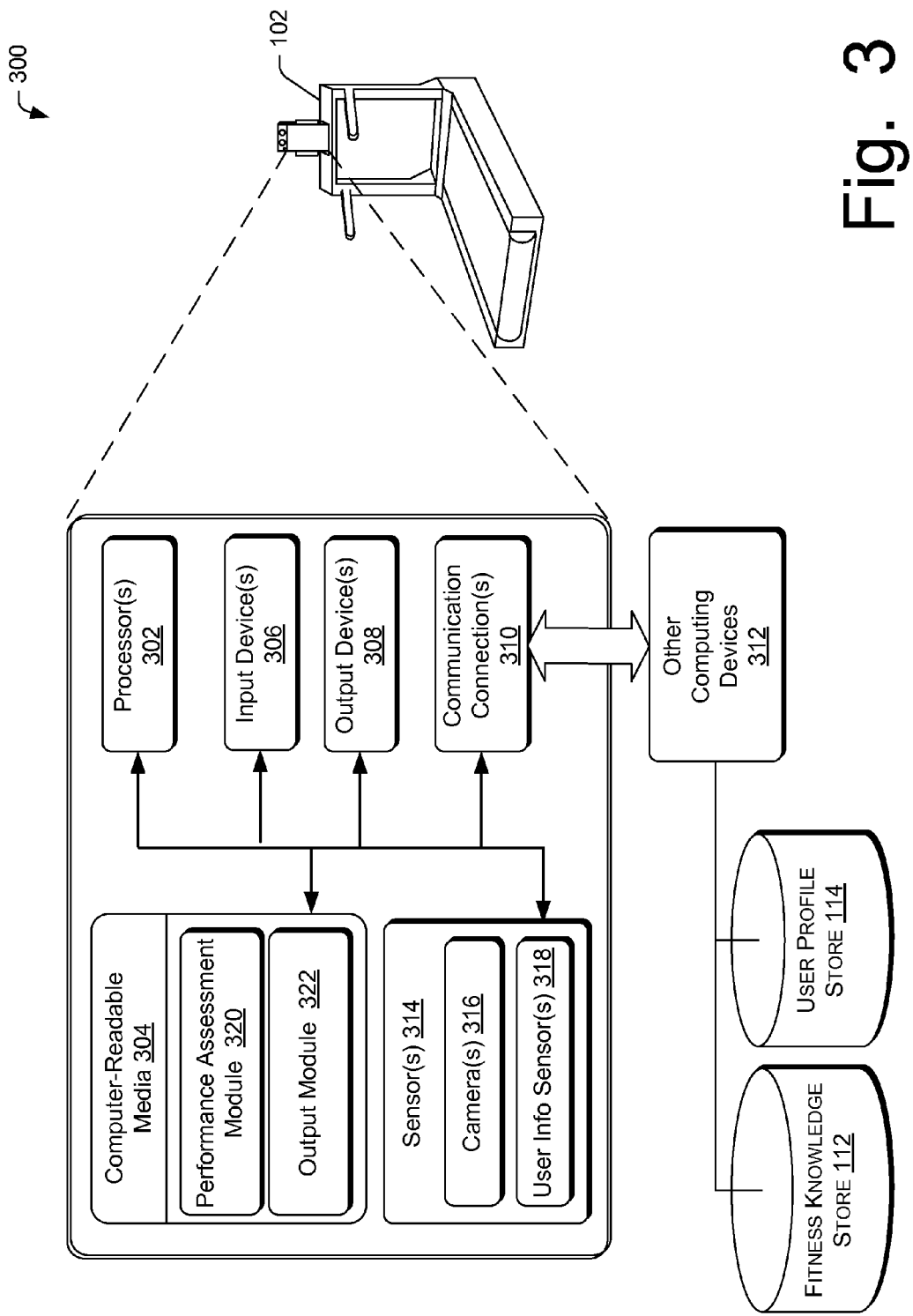
FIG. 3 is a block diagram of an example computing environment of an example fitness machine, including various components of the fitness machine.

FIG. 3 is a block diagram of an example computing environment 300 including an example networked fitness system 111, such as the fitness machine 102 of FIG. 1. The computing environment 300 shown in FIG. 3 is only one illustrative example of a computing environment and is not intended to suggest any limitation as to the scope of use or functionality of the computing environment 300. Neither should the computing environment 300 be interpreted as having any dependency nor requirement relating to any one or combination of components illustrated in FIG. 3.

In at least one configuration, the fitness machine 102 comprises one or more processors 302 and computer-readable media 304. The fitness machine 102 may also include additional data storage devices (removable and/or non-removable) such as, for example, magnetic disks, optical disks, or tape. Such additional storage may include removable storage and/or non-removable storage. Computer-readable media 304 may include, at least, two types of computer-readable media 304, namely computer storage media and communication media. Computer storage media may include volatile and non-volatile, removable, and non-removable media implemented in any method or technology for storage of information, such as computer readable instructions, data structures, program modules, or other data. The system memory, the removable storage and the non-removable storage are all examples of computer storage media. Computer storage media includes, but is not limited to, random access memory (RAM), read-only memory (ROM), erasable programmable read-only memory (EEPROM), flash memory or other memory technology, compact disc read-only memory (CD-ROM), digital versatile disks (DVD), or other optical storage, magnetic cassettes, magnetic tape, magnetic disk storage or other magnetic storage devices, or any other non-transmission medium that may be used to store the desired information and which may be accessed by the fitness machine 102. Any such computer storage media may be part of the fitness machine 102. Moreover, the computer-readable media 304 may include computer-executable instructions that, when executed by the processor(s) 302, perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The processor(s) 302 and computer-readable media 304 may be housed within the enclosure of the display 206 shown in FIGS. 2A and 2B, or the processor(s) 302 and computer-readable media 304 may be located at any other suitable position within the fitness machine 102 structure. The fitness machine 102 may include one or more input devices 306, such as the touch screen display 206, physical buttons (e.g., keyboard or keypad) on the display 206 and/or the fitness machine 102, the camera-based sensor 204 of FIGS. 2A and 2B configured to receive gestural input from the user 104, a microphone or microphone array for receiving voice input commands from the user 104, pointing devices (e.g., mouse, pen, stylus, etc.), remote controls, or any other suitable input device for interfacing with the fitness machine 102.

The fitness machine 102 may include one or more output devices 308 such as the display 206, the speakers 208, or any other suitable output device coupled communicatively to the processor(s) 302 and the computer-readable media 304. The output devices 308 may serve the purpose of providing output to the user 104, such as providing fitness related information via the display 206, for example, or providing an evaluation of the user's exercise performance and/or an instruction for the user 104 to take corrective action during an exercise routine. The fitness machine 102 may be configured to provide any suitable visual data via the display 206 to the user, such as cable television content, streamed video, image or text data, such as from the server(s) 108(1)-(N). The display 206 may further be configured to enter a "sleep" state after a predetermined time has passed with no input to the fitness machine 102.

The fitness machine 102 may further contain communications connection(s) 310 that allow the fitness machine 102 to communicate with other computing devices 312 such as via a network. The other computing devices 312 may include the client device 106 and the server(s) 108(1)-(N), among other computing devices 312. Accordingly, the communications connection(s) 310 may facilitate communication over the network(s) 110 to enable the fitness machine 102 to access the fitness knowledge store 112 and/or the user profile store 114. Additionally, the communications connection(s) 310 may enable WiFi-based communication such as via frequencies defined by the IEEE 802.11 standards, short range wireless frequencies such as Bluetooth®, or any suitable wired or wireless communications protocol that enables the fitness machine 102 to interface with the other computing devices 312 in relatively close proximity to the fitness machine 102.

The fitness machine 102 may further include one or more sensors 314, such as one or more camera-based sensors 316 to detect image data of a user on the fitness machine 102. In some embodiments, the one or more camera-based sensors 316 may include the camera-based sensor 204 and possibly the one or more cameras 216 discussed with reference to FIGS. 2A and 2B. The one or more sensors 314 may further include one or more user information sensors 318, such as the scanning device 212 of FIG. 2B, configured to noninvasively collect various vital measurements from the user 104. Together, the sensors 314 are configured to collect various types of information about the user 104. For instance, the one or more camera-based sensors 316 are configured to collect image data from the user 104 before, during, and after exercising on the fitness machine 102. The user information sensors 318 may be configured to collect other types of information about the user, such as vital measurements, and similar information that may not be detectable from visual cues alone.

The computer-readable media 304 of the fitness machine 102 may store various modules, including a performance assessment module 320 and an output module 322. The performance assessment module 320 may include processing software (e.g., fuzzy logic software) that is configured to process signals received from the sensor(s) 314 and the input device(s) 306 to determine an exercise performance condition of the user 104. For example, the performance assessment module 320 may receive image data collected by the camera-based sensor 316, analyze the image data to determine an exercise performance condition of the user 104 by referencing information obtained from the fitness knowledge store 112, and evaluate the exercise performance condition in terms of how well the user 104 is performing (e.g., ideally, incorrectly, etc.). For example, an exercise performance condition derived from the collected image data may include a condition of the body form of the user 104 (e.g., body lean the left of vertical, etc.). An evaluation of the example exercise performance condition may indicate poor body form, and may be provided to the user 104 as constructive feedback via the output device(s) 308. In some embodiments, the performance assessment module 320 may be configured to process inputs from other external sensors, such as the e-textile sensor described above. The collected data from such an external sensor may be received via the communication connection(s) 310 of the fitness machine 102.

The output module 322 may be configured to output the evaluation of the exercise performance condition made by the performance assessment module 320. Additionally, in cases where the evaluation indicates performance that is anything but ideal, correct, or expected, an instruction to take corrective action (e.g., "keep upper body erect", etc.) may be provided by the output module 322. The output module 322 may cause such information to be output via the output device(s) 308, such as by displaying video, graphics, image, and/or text data via the display 206, and/or providing audio output via the speakers 208 (e.g., audible instructions, or signals to take corrective action).

In some embodiments, the output module 322 is configured to generate and display, via the display 206, an avatar of the user 104 based on information about the user 104 in the user profile store 114 and/or data collected from the sensor(s) 314. The avatar provided by the output module 322 may be any graphical representation of the user 104 in two-dimensional or three-dimensional form. In some embodiments, the avatar may loosely resemble the physical appearance of the user 104 and track the user's progress by changing the appearance of the avatar as the user loses (or gains) weight and/or gains (or loses) strength. For example, based on height, weight, gender, and other suitable information obtained about the user 104 from the user 104 and/or the sensors 314, an avatar may be created that is reflective of the user's traits that may be visually depicted by the avatar. The output module 322 may be configured to present current avatars with (e.g., next to) previous avatars of the user 104 that were generated days, weeks, months, or years earlier in order to show progress that the user 104 has made over time in terms of his/her fitness. The output module 322 may be configured to enable other entertainment-related functions, such as to output a competitor avatar to virtually compete with the user 104 during the exercise routine, scenery (e.g., varying landscapes that change with movement of the user 104 while on the fitness machine 102, specific race courses, etc.), music, and/or video media.

In some embodiments, user interface aspects of the networked fitness system 111 may present as a virtual assistant, such as an operating system agent, that is given a persona (e.g., Zsolutionz™ Optimal Fitness Interactive Experience (ZOFIE™)) so that the user 104 may experience a more personalized or human type of interaction with the platform. Some aspects of the virtual assistant may be downloaded to the client device(s) 106 and/or the fitness machine 102 for access thereon even when a network connection is unavailable. However, information accessible to the virtual assistant may remain "in the cloud" so that the virtual assistant may provide a customized exercise experience to the user 104 from any location where a network connection is available.

It is to be appreciated that some or all of the components and corresponding functionality described herein with reference to FIG. 3 may be provided by one or more computing device, such as the client device 106, which may represent at least part of the networked fitness system 111. For example, sensors 314 embedded in, coupled to, or otherwise associated with the client device 106 may be configured to collect data (e.g., image data) about the user 104 in order for the client device 106 to analyze the data to determine an exercise performance condition (e.g., body form of the user 104) and output an evaluation of the exercise performance condition or an instruction to take corrective action. Thus, the networked fitness system 111 may be implemented in virtually any suitable environment, such as outdoors. For instance, the sensors 314 may be mounted at any suitable location (e.g., in a living room of a user's home) and coupled to (e.g., embedded within) a networked client device 106 so that the sensors 314 can collect fitness-related information about the user 104, even when the user 104 is not on a fitness machine 102. In these scenarios, the sensors 314 may be capable of being mounted on a variety of structures in different environments (e.g., flat surface mounting, clips, ball-and-socket mounts, etc.), or otherwise be embedded in a client device 106 that may be carried or worn by the user 104. The more sensors 314 that are available to collect information may allow for more accurate customization of exercise regimens. For example, a fitness machine 102 equipped with a high number of sensors 314 may more accurately assess fitness-related information about the user 104 than a wearable device 106 with fewer available sensors 314.

Example User Setup and Exercise Routine

Use of the fitness machine 102 according to the embodiments disclosed herein may begin by initially creating a user profile for the user 104 that may be associated with information about the user 104 and stored in the user profile store 114. The user 104 may use any suitable computing device, such as the client device 106 and/or the fitness machine 102, to input information for profile creation. Such information, as mentioned above, may include a username, password, name, mailing address, phone number, e-mail address, gender, date of birth, race or ethnicity, height, weight, health conditions (e.g., heart disease, cancer, previous strokes, etc.). The user 104 may link other accounts, such as social networking accounts as part of the setup of his/her user profile in the user profile store 114. The user 104 may provide answers to questionnaires via the client device 106 and/or the fitness machine 102. The client device 106 and/or the fitness machine 102 may be configured to obtain information about the user from other sources, such as a Nike® FuelBand or similar source of fitness related information.

The user 104 may input, via the client device 106 (e.g., an application or browser) or the fitness machine 102 user interface, initial fitness goals, such as to "lose weight", "stay fit", "improve endurance", "train for a race", and/or "recover from injury" so that the fitness machine 102 may prescribe a workout regimen tailored to the user 104. The fitness machine 102 may deduce initial fitness goals based on answers to specific questions provided to the user 104. The user 104 may further specify a current physical health level, diet or daily calorie intake, availability, activity level (casual vs. competitive), workout history, and any pertinent exercise routines that the user 104 may prefer over others.

Once all of the relevant information is collected from the user 104 and a profile is created, the fitness machine 102 and/or the client device 106 may display options of how long a particular workout regimen will take with and without dieting. The user 104 may select an option based on whether he/she desires to change their diet according to the diets specified by the fitness machine 102. Other useful links may be provided to the user 104 to augment the prescribed workout regimen, such as other forms of cross training, weight training, resistance training, and the like.

The following paragraphs describe a plurality of "phases" for a workout program. Any individual phase may be optional, and thereby omitted from the overall set of phases that are implemented. In this sense, some or all of the following phases may be implemented as part of the exercise regimen for a user 104.

Phase I

When the user 104 is ready to begin a first exercise routine prescribed by the fitness machine 102, the user 104 may step onto the fitness machine 102 and a short introduction video may be presented via the display 206 to show what will take place over the course of the prescribed exercise regimen until a goal is achieved. This could be shown each time the user 104 uses the fitness machine 102 and may be skipped by the user 104 after an initial viewing.

The fitness machine 102 may collect, via the sensors 314, current information about the user 104, including current vital measurements. For example, the sensors 314 may collect information including, but not limited to, weight and height (to calculate BMI), resting heart rate, blood pressure, temperature, hydration, resting respiratory rate, blood glucose level, and other suitable health measurements.

The output module 322 may create an avatar for the user 104 based on the collected information about the user 104 from the sensors 314 and based on information in the user profile store 114. The avatar may be displayed via the display 206, and if the user 104 has completed previous exercise regimens, the avatar may be compared to an initial avatar based on previous user information (e.g., previous health measurements) in order to show the user 104 any progress he/she has made. In some embodiments, the user 104 may customize or otherwise manipulate the avatar. For example, the user 104 may select different hair colors, hair styles, clothing, body markings or piercings, and the like, to be shown on the avatar.

The user 104 may be asked a series of questions that are designed to gather subjective input from the user 104. For example, the user 104 may be asked, via questions presented on the display 206 or via the speakers 208, "how do you feel?" with options of "Excellent, Good, Tired, or Sick" as possible answers. The user 104 may be asked "How well did you sleep last night?" with options of "Very well, Fine, Restless, Not well" as possible answers. The user 104 may be asked "Do you have any areas of discomfort?" with an image of a human (e.g., the created avatar) presented on the display 206 for the user 104 to touch the display 206 at the portion of the human image where they currently have discomfort. The user 104 may be asked "When was your last meal?" and "Was it a good meal?" The user 104 may be asked "how much time do you have available to exercise?" The user 104 may be asked "How is your overall fitness?" The user's answers may be provided by various ones of the input devices 306 (e.g., touch screen input, voice input, etc.).

Phase II

When Phase I (Pre-Training) is complete, the fitness machine 102 may proceed to Phase II where the user 104 may be instructed to perform one or more warm up stretches. The output devices 308 may facilitate instructions to the user 104 on how to perform the warm up stretches, such as by showing images, video, and/or text via the display 206 on how the stretch(es) should be performed, perhaps with audible instructions provided by the speakers 208. During the warm up stretching, the user 104 may manipulate any linear-based presentation (e.g., video) by pausing, rewinding, fast-forwarding, stopping, skipping, or other suitable UI controls provided on the touch screen display 206 or another input device 306 (e.g., remote control, voice, etc.). The fitness machine 102 may instruct the user 104 to perform one or more dynamic stretches for a recommended number of times, and may continually monitor the user 104 via the one or more camera-based sensors 316 (e.g., the camera-based sensor 204) to determine an exercise performance condition including the pose of the user 104 to evaluate whether the user 104 is performing the stretches correctly and/or for the recommended number of times. The user 104 may request more stretches from the fitness machine 102, or the user 104 may skip over certain ones of the stretches.

A warm up routine may begin after the user 104 has completed the warm up stretches. The warm up routine may include exercising at a moderate pace (e.g., walking, jogging, etc.) to achieve proper vital levels (e.g., heart rate, respiratory rate, etc.). During the warm up routine, the camera-based sensor(s) 316 may capture movements of the user 104 to determine exercise performance conditions (e.g., body form, pace, etc.) in order to evaluate walking/running form. The user information sensors 318 may monitor other vitals, such as hydration, heart rate, and the like, to detect any concerns. External sensors, such as the aforementioned e-textile sensor, may detect exercise performance conditions involving weight distribution on the feet of the user 104 to detect any potential concerns with how the user 104 is distributing weight during the warm up routine.

When the user 104 has reached target levels (e.g., 60%-80% of a predetermined heart rate level for exercise), the fitness machine 102 may ask the user 104, via the output device(s) 308, if the user is ready to begin the exercise routine and/or inform the user that his/her exercise routine will start. The user 104 may specify that they are not ready, and the fitness machine 102 may provide the user 104 with more time to get ready. The user 104 may stop the program entirely at any point in time. If the user 104 stops the program at any time, any data that has been captured by the sensors 314 may be uploaded to the server(s) 108(1)-(N) and stored in the user profile store 114 as part of a workout history of the user's profile.

The user 104 may be asked whether they would like music, video media, a competitor, and/or scenery while he/she exercises. The output device(s) 308 may be configured to provide the aforementioned functions to the user 104. In some embodiments, music may be streamed from other computing devices 312, such as the client device 106, via Bluetooth®, for example. Video media may be presented in the form of a cable television signal or streamed video media from the other computing devices 312 including but not limited to Internet feeds, such as YouTube® or Netflix®.

Phase III

When the exercise routine begins, the user 104 starts exercising according to the exercise routine prescribed by the fitness machine 102. If Phase II (as described above) is skipped or omitted, the prescribed exercise routine of Phase III may include a warm-up portion that may or may not be "transparent" to the user 104. For example, the exercise routine may slowly ramp up to a "full speed" exercise routine by seamlessly transitioning through a warm-up phase. The user 104 may be notified of the warm-up phase before or during the ramp up period, or the system may not provide any notification to the user 104 such that the user 104 may be more or less unaware of the occurrence of a warm-up phase.

The exercise routine may comprise a steady or variable pace or speed, resistance, and/or incline over a prescribed duration of time. During the exercise routine, the fitness machine 102 may continuously monitor the user 104 with the sensors 314. For example, vital information may be monitored over the course of the exercise routine with the user information sensors 318 and/or external sensors provided by the user 104. Additionally, or alternatively, movements of the user 104 may collected by the camera-based sensors 316. For example, body form (e.g., running form) may be monitored by determining the angle or flex of the user's arms, the lateral swing of the user's limbs, angle of the user's head, contact of the user's foot with a running/walking surface, and/or whether the user's torso is erect or lordotic. The camera-based sensors 316 may also be configured to detect and interpret muscle images to determine how tense or relaxed the user's neck, arms, shoulders, and/or hands are while exercising. All of this information may be detected from image data collected by the camera-based sensors 316 to determine an exercise performance condition (i.e., body form, muscle tension, etc.).

In some embodiments, one or more of the user information sensors 318, such as the scanning device 212, may be configured to detect vital information when the user 104 touches the sensor (e.g., places the scanning device 212 to his/her forehead) for a predetermined period of time, while other ones of the user information sensors 318 may work without the need to have the user 104 touch or wear the sensor 318.

The display 206 may constantly, or periodically, display information regarding the sensed vital information of the user 104, such as heart rate, oxygen level, hydration level, and the like. In some embodiments, color coding may be utilized on the display 206 to indicate an evaluation of exercise performance conditions of the user. For example, text-based vital information can be presented on the display 206 in green font, or with an associated green colored symbol, to indicate ideal or acceptable vital levels, while yellow colored text or symbols may indicate that levels are slightly deviated from ideal or normal/acceptable levels, and red colored text may indicate a warning that vital levels are extreme (e.g., too high or too low). The determination of appropriate vital levels may be based on a performance goal of the user 104, and/or an injury prevention metric. For example, in order for the user 104 to achieve a target heart rate, the heart rate information displayed to the user 104 via the display 206 may indicate that the user's heart rate is too low to achieve the exercise goal for the current routine. As another example, in order to prevent injury to the user 104, the fitness machine 102 may output a hydration level measurement and warn the user 104 (e.g., with red color coding) that his/her hydration level is too low, and that they need to rehydrate so that the user 104 does not pass out from dehydration.

In some embodiments, the fitness machine 102 may be configured to vary the speed, resistance, incline, and/or duration to help the user 104 achieve target levels of performance or to prevent injury. For example, if a prescribed exercise routine was originally designed to burn a predetermined number of calories or achieve a target heart rate for the user 104, and the fitness machine 102, via the sensors 314, may determine that the user 104 will not achieve target performance levels with the originally prescribed routine, and may adjust speed, resistance, incline, and/or duration of the exercise routine, or otherwise dynamically modify the prescribed exercise routine to help the user 104 achieve goals, or to minimize risk of injury. In some embodiments, the adjustment or modification of the prescribed exercise routine is done automatically by the fitness machine 102, while in other embodiments, feedback or instruction is provided to the user 104 who may then manually adjust or modify the exercise routine themselves (e.g., modify speed, resistance, incline, and/or duration manually).

In some embodiments, the camera-based sensors 316 may interpret movements of the user 104 to indicate an exercise performance condition that the user 104 is running with a certain body form that indicates fatigue. If the user 104 does not correct their body form after a predetermined time following an instruction to correct the user's running form, the fitness machine 102 may slow the speed, resistance, incline, decline, and/or duration to minimize the risk of injury to the user 104.

Figure 4A:
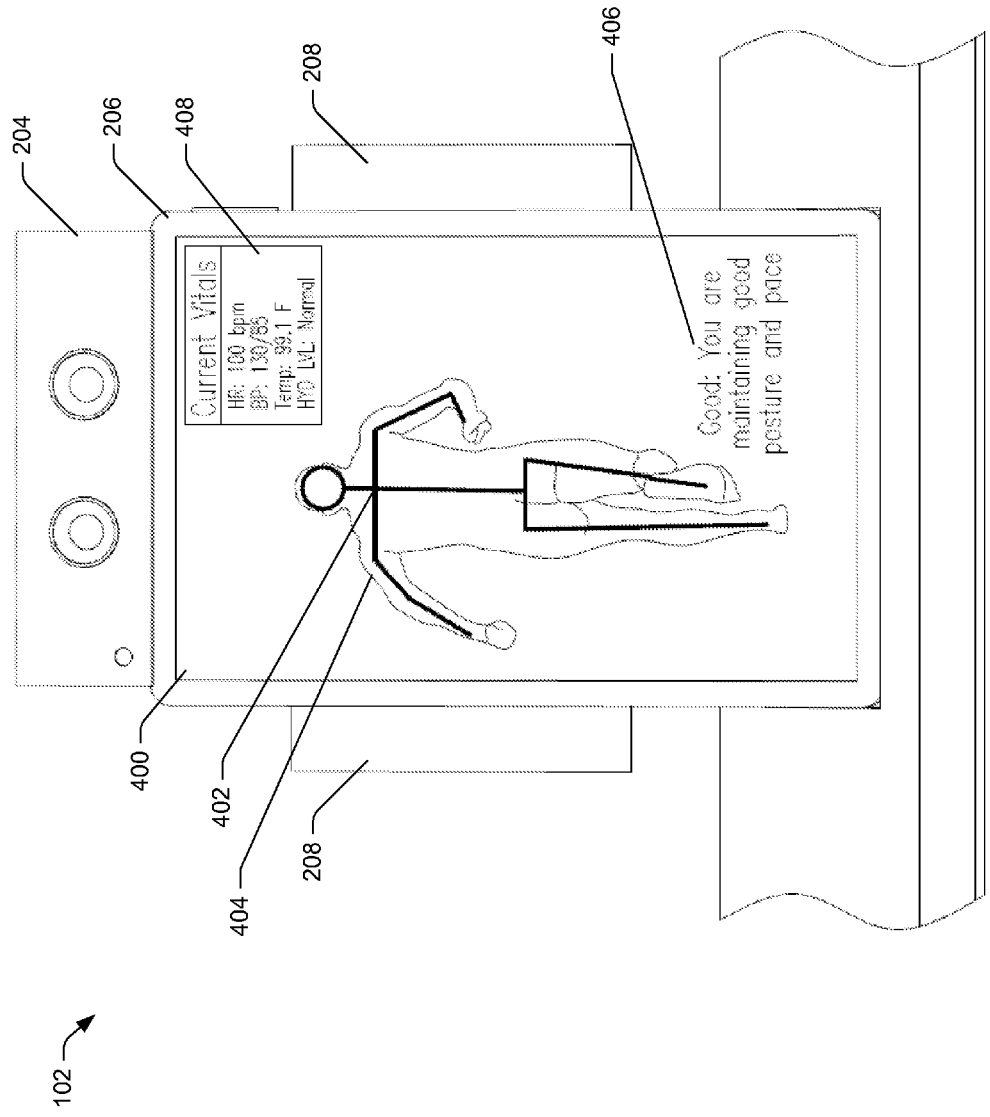
FIG. 4A illustrates a partial view of an example fitness machine and a user interface (UI) from the perspective of a user on the fitness machine, the UI providing feedback of an exercise performance condition.

FIG. 4A illustrates a partial view of an example fitness machine 102 and a user interface (UI) 400 as seen from the perspective of a user 104 on the fitness machine 102. The UI 400 may be presented on the display 206 of the fitness machine 102, and may show a current image or avatar 402 of the user 104 overlaid onto an image of a reference user 404 that is exercising (e.g., running) at a pace according to the prescribed exercise routine and with correct body form (e.g., running form). Camera-based sensor(s), such as the camera-based sensor 204, or camera-based sensor(s) 316, may capture the image data of the user 104 that may be interpreted and used by the output module 322 to render the avatar 402 of the user 104. By overlaying the avatar 402 of the user 104 on top of the image of the reference user 404, the fitness machine 102 is able to provide constructive visual feedback to the user 104 regarding an exercise performance condition; in this case, his/her current running form and pace.

In FIG. 4A, the user 104 is shown as currently running with good posture and/or pace according to the fitness machine 102. In some embodiments, the entire avatar 402 may be color coded (e.g., green, yellow, or red) to indicate an evaluation of an exercise performance condition including body form and/or pace. Specific portions of the avatar 402 may be color coded according to whether that portion of the user's body is maintaining proper form so that different portions of the avatar 402 are different colors. For example, the user's arm or leg may be highlighted in yellow or red if it needs to be corrected, while the remainder of the avatar 402 is green. Individual ones of the user's muscles that are detected as being too tense may be highlighted in a color coded manner (e.g., muscles that are too tense are highlighted in red color). Likewise, pressure points, such as pressure points on the user's feet may be shown visually via the display 206, or another suitable display.

In some embodiments, text 406 and/or audio output may be provided to the user 104 in addition to, or in lieu of, the avatar 402. The text 406 and/or audio output may provide an evaluation of an exercise performance condition (e.g., "Good: You are maintaining good posture and pace") and/or an instruction to take corrective action if the evaluation of the exercise performance condition is one where the performance of the user 104 is not ideal or incorrect for any reason. Vital levels 408 may be provided on a portion of the UI 400 to indicate other health measurements of the user 104 taken by the sensors 314.

Figure 4B:
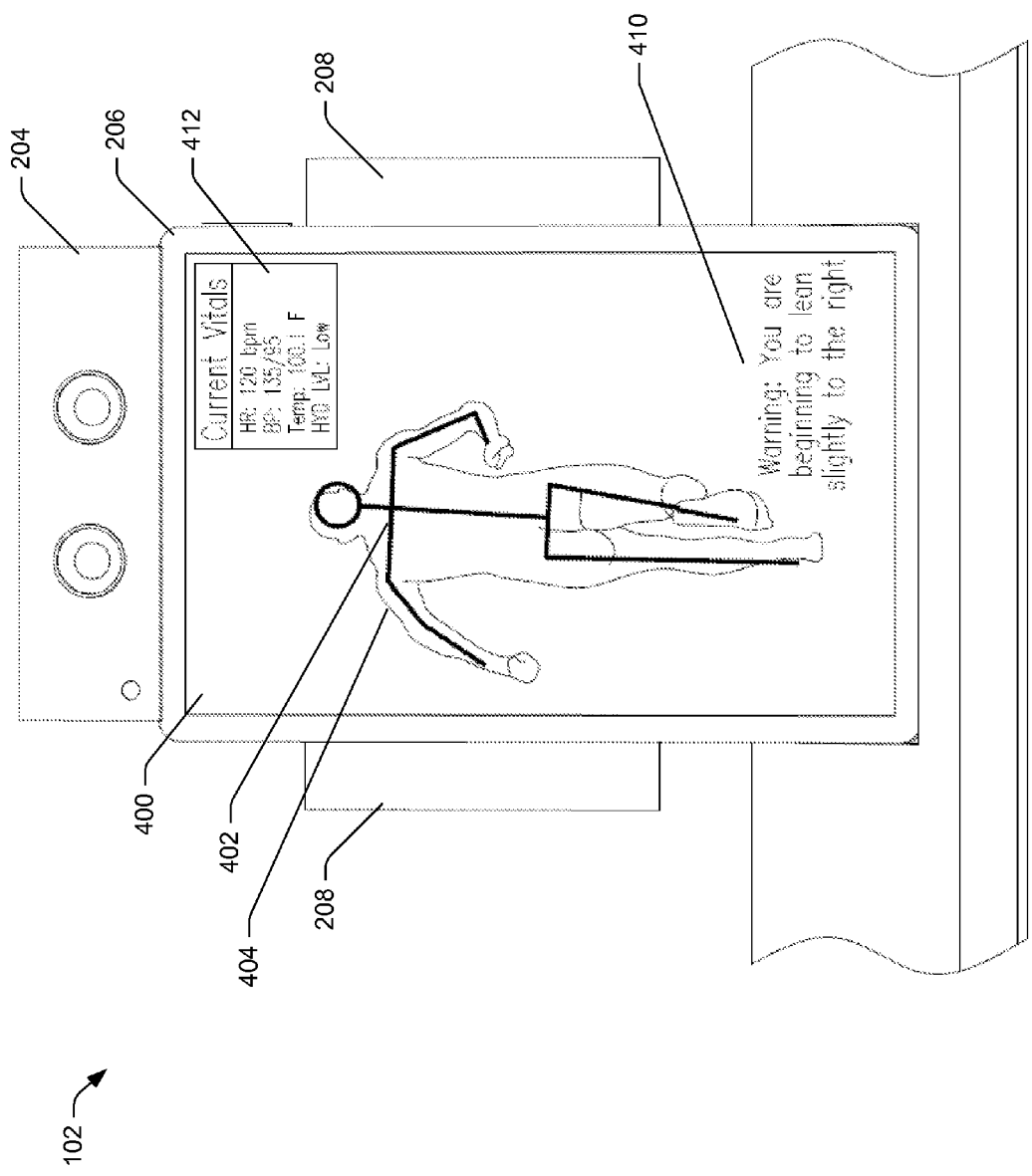
FIG. 4B illustrates the partial view of the example fitness machine and UI of FIG. 4A with feedback of another exercise performance condition.

FIG. 4B illustrates the partial view of the example fitness machine 102 and UI 400 of FIG. 4A with feedback of another exercise performance condition. Specifically, camera-based sensor(s), such as the camera-based sensor 204, or camera-based sensor(s) 316, may collect image data that is interpreted by the performance assessment module 320 as the user 104 exercising with somewhat incorrect body form and/or pace.

The output module 322 may render the avatar 402 according to the exercise performance condition (perhaps color coded as yellow, for example) to provide feedback to the user 104 that they are not exercising with ideal body form and/or pace. FIG. 4B also shows text output 410 that is warning the user 104 that he/she is beginning to lean slightly to the right. In addition to the text output 410 that comprises an evaluation of the user's exercise performance condition, an instruction to correct body form and/or pace may be provided to the user 104 via text and/or audio output. The avatar 402 and/or the text output 410 may be color coded in yellow to signify the evaluation to the user 104. In addition, at least some of the vital information 412 may be color coded if levels are higher or lower than thresholds indicative of warning conditions.

The constructive feedback in FIG. 4B may be output to the user 104 until the user 104 corrects his/her body form and/or pace according to the feedback provided. The amount of time that the evaluation and/or instruction is provided to the user 104 may depend on the type of user profile (e.g., casual, recreational, competitive, etc.) that is associated with the user 104. For example, if the user 104 is associated with a casual exercise user profile, the evaluation and/or instruction may be provided to the user 104 for a shorter time period than it otherwise would be for a competitive user profile. In this manner, if the user 104 does not take corrective action by the time the predetermined time period has lapsed, the fitness machine 102 may modify the exercise routine to prevent injury or to cater to the user's current performance until the user 104 is able to regain ideal or correct body form and/or pace. The UI 400 may indicate when the time period has lapsed and that the fitness machine 102 is slowing down to forewarn the user 104. If the user 104 never regains proper body form and/or pace, even after slowing down the exercise routine, the fitness machine 102 may gradually slow down and stop the exercise program to prevent injury to the user 104.

In a similar fashion, vital information 412 may be monitored to determine if the fitness machine 102 should modify the exercise routine to prevent injury and/or cater to the user's current performance. The user 104 may be given options to quit the exercise routine at any time in lieu of taking corrective action.

Figure 4C:
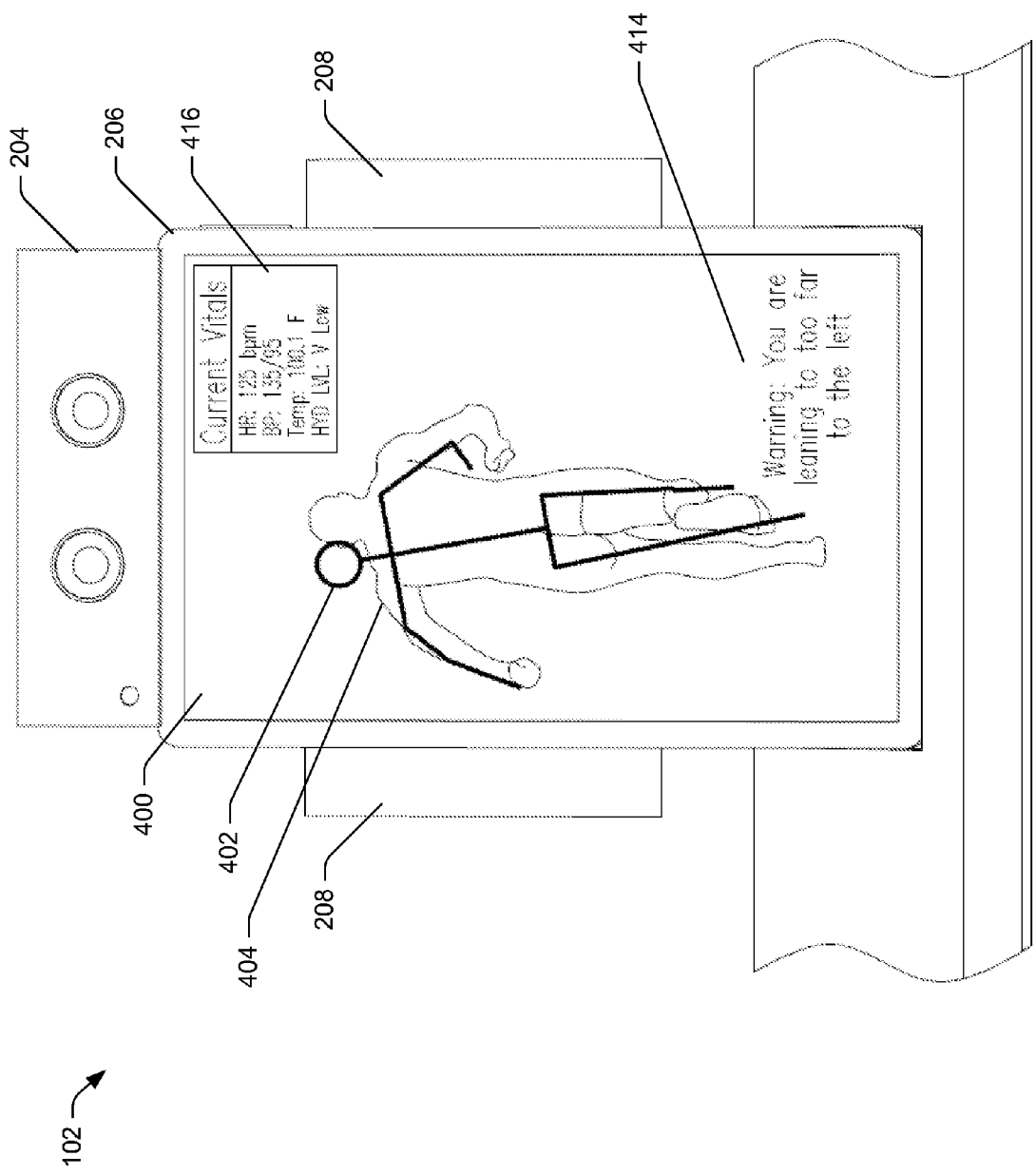
FIG. 4C illustrates the partial view of the example fitness machine and UI of FIG. 4A with feedback of yet another exercise performance condition.

FIG. 4C illustrates the partial view of the example fitness machine 102 and UI 400 of FIG. 4A with feedback of yet another exercise performance condition where the user 104 is exercising with severely poor body form and/or pace. Accordingly, the avatar 402 may be color coded in a red color to indicate a severe warning to the user 104. Text output 414 may provide a warning that the user 104 is leaning too far to the left and may be color coded in red font or associated with a red symbol. At least some vital information 416 may be displayed and/or color coded when they reach warning levels (e.g. hydration level too low).

Phase IV

When the exercise routine is completed, the fitness machine 102 may initiate a cool down program. The cool down program may reduce the speed, resistance, and/or incline in order to reduce the heart rate of the user 104 to a level that is close to the resting heart rate of the user 104 measured during Phase I. In some embodiments, the display 206 may present a video, graphics, or images of cool down stretches recommended for the user 104 to cool down. Other optional cool down programs may be presented to the user 104 for selection, such as sitting and performing static stretches, walking around and hydrating, or other suitable cool down methods.

The cool down program may be implemented similarly to the warm up program in that the display 206 may present audio and video, images, graphics, etc., and the user 104 may pause, skip, rewind, and the like, to control the cool down presentation. Furthermore, the camera-based sensors 316 may collect image data of the user 104 when stretching to determine exercise performance conditions on body form and number of repetitions. This allows the fitness machine 102 to provide constructive feedback for the user 104 to correct body form, for example, if stretches are being performed incorrectly.

Phase V

An end routine may be implemented after cool down that shows a summary of important information via the display 206. In some embodiments, the summary may be uploaded to the cloud (i.e., the server(s) 108(1)-(N)) and/or sent to other computing devices or accounts of the user 104, such as the client device 106 or the user's e-mail, social networking account, and so on. The summary may include, but is not limited to, distance traveled, speed, calories burned, pace, and vital information measured during the exercise routine. Information such as speed, pace, and vital measurements may be presented as a graph (i.e., line graph) over the duration of the workout, and/or presented as average values. The summary may be presented via any suitable device and may give the user 104 the option to select a link for more detailed information containing charts, graphs, tables, etc.

The end routine may further involve asking the user 104 a series of questions, preferably via the display 206 of the fitness machine 102, or via the client device 106. The questions may include, but are not limited to, the following: (a) How do you feel after the workout?; (b) How would you rate the exercise routine?; (c) What went well or not so well with the workout? Answers may be selected from multiple choice options for efficiency purposes.

In some embodiments, the summary may highlight what went well during the exercise routine, such as distance, speed, calories burned, stance, pace, vital information, and the like. The summary may further indicate areas for improvement to be attempted during the next exercise routine.

In some embodiments, a short video or other suitable type of presentation may be shown to the user regarding what will be covered in the next exercise routine so that the user 104 may mentally prepare for the next exercise routine. The presentation of the next exercise routine may provide information on the distance, speed, pace, and/or duration to be covered in the next exercise routine. The summary may further give general or specific recommendations for the user 104 to act on in between exercise routines, such as to hydrate properly, eat a proper diet, or practice a running technique to improve running form.

In some embodiments, the summary may show progress made toward an overall goal. An avatar may be generated at the end of the exercise routine to reflect the accomplishments of the user 104 and it may be compared to a previous or initial avatar to indicate progress. In some embodiments, the fitness machine 206 may schedule a date and time for the next exercise routine, if it is not already scheduled, and add the scheduled routine to a calendar maintained by the user 104. Additionally, or alternatively, scheduling is performed from the server(s) 108(1)-(N) and the client device 106 of the user 104, such as when the user 104 wants to leave immediately following the workout and take care of scheduling at a later time.

All information collected during the workout, whether the workout was completed, or whether the user 104 quit or aborted the workout, is uploaded to the server(s) 108(1)-(N)

and stored in the user profile store 114. Information uploaded to the cloud may include, but is not limited to, vital measurements, image data, videos of the exercise routine, or any other suitable information. A workout history for the user 104 may be built over time to show fitness performance data that may be analyzed over time to identify trends, or other useful statistics that the user 104 may find valuable. The user 104 may share the uploaded information via social networking sites, with a health care professional, personal trainer, coach, insurance company, or the like.

Example Processes

Figure 5:
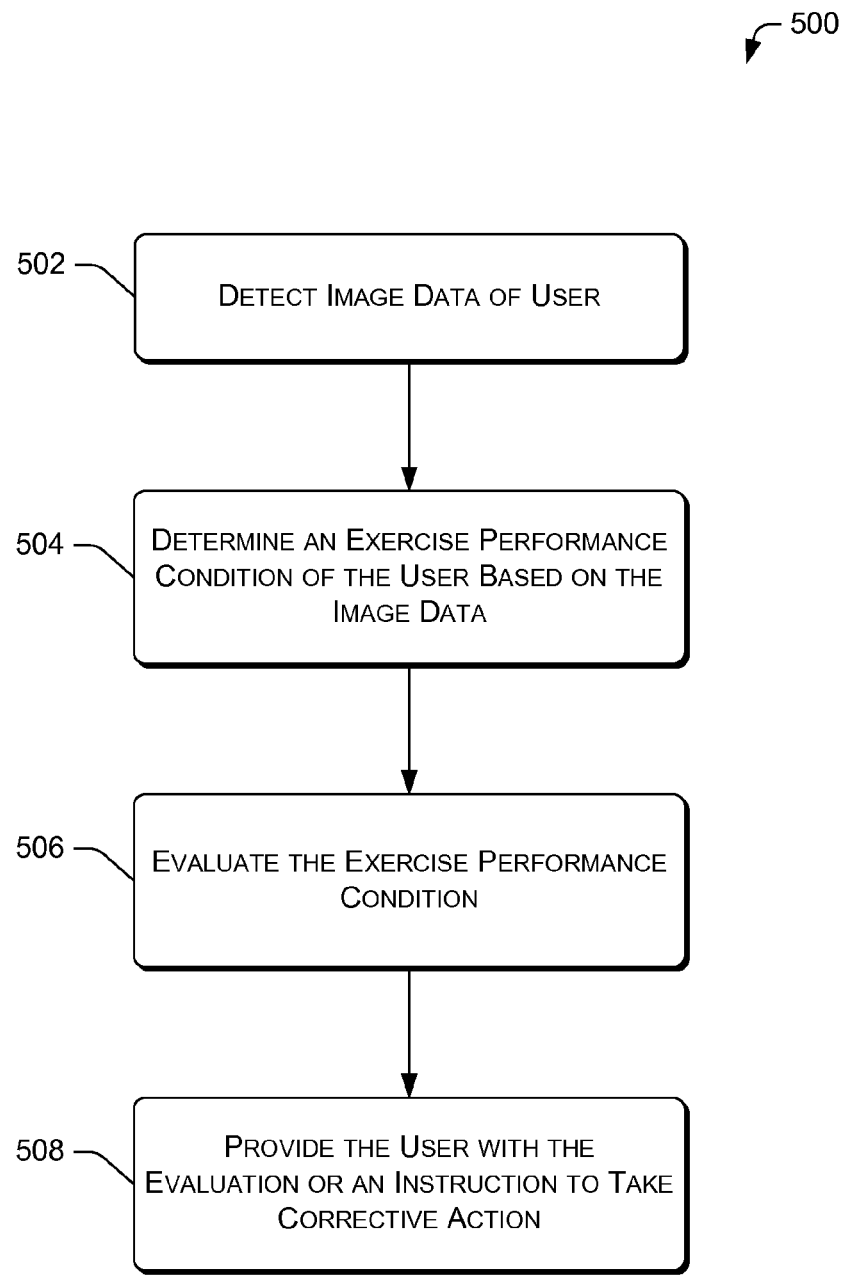
FIG. 5 is a flow diagram of an illustrative process of evaluating an exercise performance condition of a user on an example fitness machine of the embodiments disclosed herein.
Figure 6:
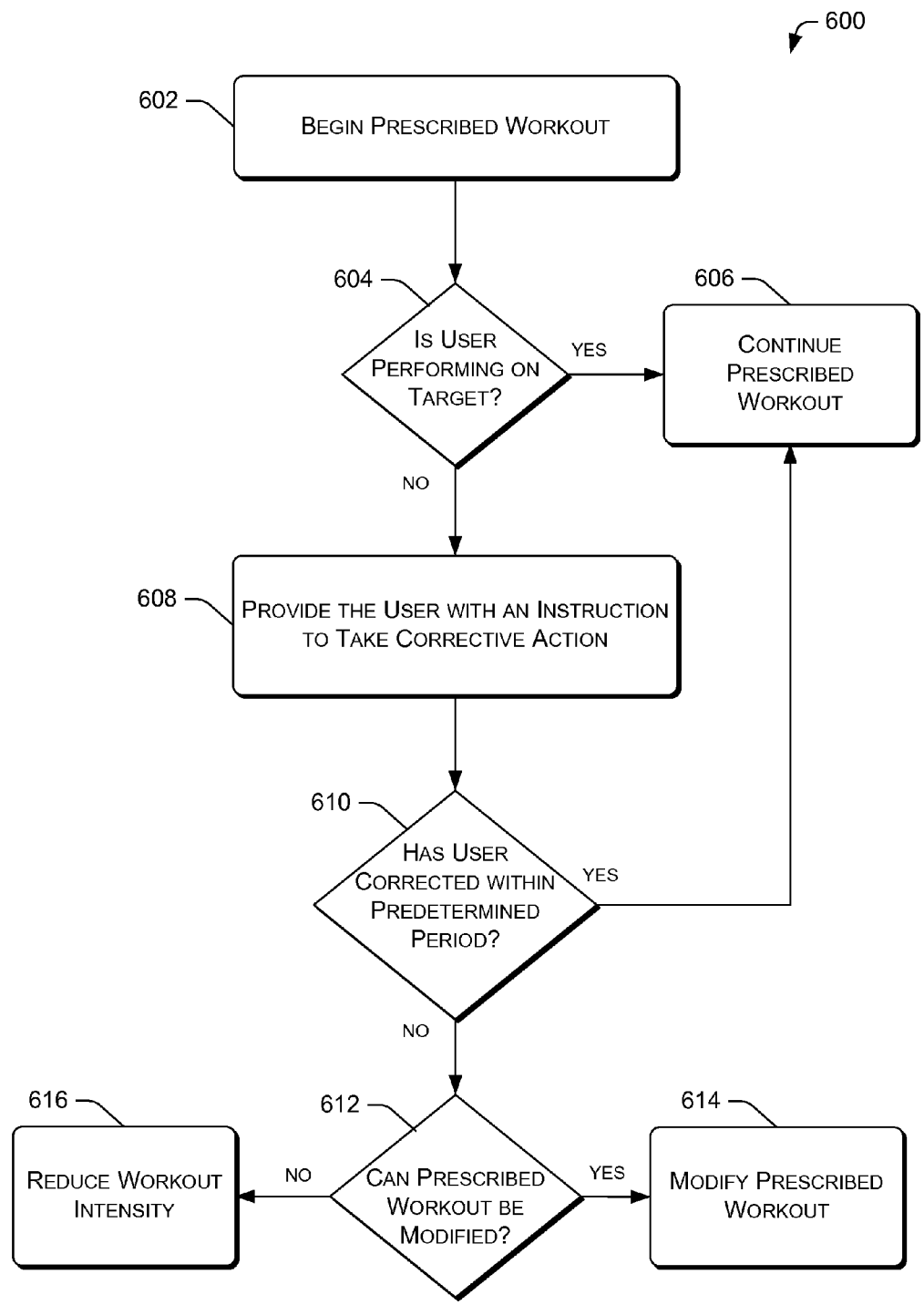
FIG. 6 is a flow diagram of an illustrative process of providing an instruction to take corrective action to a user on an example fitness machine, and modifying a prescribed workout after a period of time with no user correction.

FIGS. 5 and 6 are flow diagrams of illustrative processes. The processes are illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

FIG. 5 illustrates a process 500 of evaluating an exercise performance condition of a user 104 on an example fitness machine of the embodiments disclosed herein. For discussion purposes, the process 500 is described with reference to the fitness machine 102 of FIGS. 2A and 3, and specifically with reference to the camera-based sensor 204, the performance assessment module 320, and the output module 322. It is to be appreciated that, in instances where the fitness machine 102 is not part of the networked fitness system 111, the steps of the process 500 may be performed by any suitable device(s) (e.g., the client device 106) that constitute the networked fitness system 111.

At 502, the camera-based sensor 204 detects image data of the user 104. As described above, the image data may be a series of images (i.e., video) collected of the user 104 while the user 104 is on the fitness machine 102. The image data may be collected before, during, and/or after any exercise routine that is performed on the fitness machine 102.

At 504, the performance assessment module 320 receives the image data and interprets the image data to determine an exercise performance condition of the user 104 from the image data. For example, as depicted in FIGS. 4A-4C, an exercise performance condition may include a determination that the user 104 is exercising with a given body form (e.g., leaning to the left, lordotic torso, at a certain pace, etc.).

At 506, the performance assessment module 320 evaluates the exercise performance condition to determine whether the user 104 is exercising with good or bad body form and/or pace. The evaluation may be determined by referencing information obtained from the fitness knowledge store 112 about how exercises are supposed to be performed, according to expert opinions. By comparing the exercise performance condition of the user 104 to reference information on proper running form and/or pace, for example, the performance assessment module 320 may evaluate the exercise performance condition on various levels. For example, the evaluation may be a binary (e.g., good or bad) evaluation, or other type of leveling hierarchies, such as correct, and anything else at various warning levels (e.g., moderate warning, severe warning, etc.).

At 508, the output module 322 provides an evaluation of the exercise performance condition or an instruction to take corrective action. An evaluation may be derived from the evaluation at 506. For example, a text-based message may be provided via the display 206 of the fitness machine 102 that indicates the user 104 is exercising with good body form, or a good pace. Additionally, or alternatively, color coding may be provided on the avatar 402, or on the vital information 408 to indicate the evaluation to the user 104. An instruction may be provided in addition to the evaluation, or in lieu of the evaluation, such as when the user 104 is not performing correctly or ideally, and the instruction is a means of giving the user constructive feedback so that he/she may correct themselves and stay on track. The instruction may be provided via text, audio, audible signal, video, graphics, or the like.

FIG. 6 illustrates a process 600 of providing an instruction to a user 104 to take corrective action while exercising on an example fitness machine 102, and modifying a prescribed workout after a period of time with no user correction. For discussion purposes, the process 600 is described with reference to the fitness machine 102 of FIGS. 2A and 3, and specifically with reference to the camera-based sensor 204, the performance assessment module 320, and the output module 322. It is to be appreciated that, in instances where the fitness machine 102 is not part of the networked fitness system 111, the steps of the process 600 may be performed by any suitable device(s) (e.g., the client device 106) that constitute the networked fitness system 111.

At 602, a user 104 begins a prescribed exercise routine on the fitness machine 102. Phases II and III, as described above, may be representative of beginning the exercise routine at 602 for the purposes of the process 600. At 604, a determination is made by the performance assessment module 320 as to whether the user 104 is performing on target. The determination at 604 may include determining an exercise performance condition, as described above, and evaluating the exercise performance condition. If the user 104 is determined to be performing on target, the process 600 may proceed to 606 where the prescribed exercise routine is continued.

If the user 104 is not performing on target, the process 600 may proceed to 608 where the user 104 is provided, via the output module 322, an instruction to take corrective action. For example, the user 104 may be instructed to keep their torso erect, or the fitness machine 102 may utilize the fuzzy logic component to automatically increase the pace of exercise. At 610, another determination is made as to whether the user 104 has taken corrective action by the time that a predetermined time period has lapsed. The length of the predetermined time period may depend on the user profile type (e.g., casual vs. competitive) to give certain types of users suitable time to take corrective action. If the user 104 has taken corrective action within the predetermined time period, the exercise routine is continued at 606. If the user 104 has not taken corrective action by the time the predetermined time period lapses, the process 600 may proceed to 612, where yet another determination is made as to whether the prescribed exercise routine can be modified. In some embodiments, the fitness machine 102 is configured to utilize fuzzy logic to determine other possible exercise routines (e.g., longer duration with lower intensity) that may still achieve the goals of the user 104.

If the prescribed exercise routine can be modified, it is modified at 614 and the fitness machine 102 continues with the modified workout. If it is determined at 612 that the prescribed exercise routine cannot be modified, the process 600 may proceed to 616 where the speed, resistance, incline, and/or duration of the exercise routine is reduced, and in some embodiments, stopped.

The environment and individual elements described herein may of course include many other logical, programmatic, and physical components, of which those shown in the accompanying figures are merely examples that are related to the discussion herein.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A system comprising:
at least one camera-based sensor to detect image data of a user during an exercise routine;
one or more processors; and
one or more memories maintaining instructions that, when executed by the one or more processors, perform operations comprising:
analyzing the image data detected by the at least one camera-based sensor;
determining an exercise performance condition of the user based at least in part on analysis of the image data;
providing an instruction to correct a body form of the user;
determining, from analysis of additional image data detected by the at least one camera-based sensor, that the user has failed to correct the body form after a lapse of a predetermined period of time from providing the instruction; and
modifying the exercise routine for the user.

2. The system of claim 1, wherein the camera-based sensor is further configured to identify the user based on facial recognition.

3. The system of claim 1, further comprising one or more sensors to detect information about the user.

4. The system of claim 3, wherein the information about the user includes one or more of body weight, heart rate, blood pressure, oxygen level, hydration level, body temperature, blood glucose level, or respiratory rate.

5. The system of claim 1, wherein the exercise performance condition is further based on detected pressure forces on at least one foot of the user obtained from an electronic textile (e-textile) sensor.

6. The system of claim 1, further comprising a stationary exercise device, wherein the at least one camera-based sensor is mounted on the stationary exercise device.

7. The system of claim 6, wherein the stationary exercise device comprises a treadmill, and the exercise performance condition comprises one or more of a gait form of the user, a stride length of the user, a gait pace of the user, or muscle tension of the user.

8. The system of claim 6, further comprising:
a video display mounted at a front end of the stationary exercise device, and
wherein the operations further comprise presenting, on the video display:
an image of a reference user having an ideal exercise form, and
an avatar of the user that indicates the exercise performance condition of the user based on the image data.

9. The system of claim 8, wherein the operations further comprise overlaying the avatar of the user on top of the image of the reference user.

10. The system of claim 8, wherein the instruction is at least partly output on the video display in the form of a text-based message of the instruction.

11. The system of claim 6, wherein the one or more sensors include two or more cameras mounted on the stationary exercise device to capture at least a substantial portion of the user in the form of the image data.

12. The system of claim 11, wherein the operations further comprise composing a three-dimensional model of the user by stitching together the image data received from the two or more cameras.

13. The system of claim 11, wherein the at least one camera-based sensor is mounted at a front end of the stationary exercise device, and the two or more cameras are mounted at a back end of the stationary exercise device.

14. The system of claim 1, wherein the at least one camera-based sensor comprises a mounting structure to mount the at least one camera-based sensor onto another structure.

15. The system of claim 14, wherein the mounting structure comprises at least one of a clip, a ball, a socket, hooks, loops, or adhesive.

16. A method of evaluating an exercise performance condition of a user, the method comprising:
detecting, by a camera-based sensor, image data of the user;
analyzing the image data;
determining, by one or more processors, the exercise performance condition of the user based at least in part on analysis of the image data;
evaluating, by the one or more processors, the exercise performance condition; and
providing, on a display:
an avatar of the user; and
an evaluation of the exercise performance condition or an instruction to take corrective action by color coding a portion of the avatar that corresponds to a portion of the user's body relating to the exercise performance condition.

17. The method of claim 16, further comprising identifying, by the camera-based sensor, the user using facial recognition.

18. The method of claim 16, further comprising detecting, by one or more sensors, information about the user including one or more of body weight, heart rate, blood pressure, oxygen level, hydration level, body temperature, blood glucose level, or respiratory rate.

19. The method of claim 16, further comprising:
detecting, by an electronic textile (e-textile) sensor, pressure forces on at least one foot of the user, and
wherein the determining the exercise performance condition is further based on the pressure forces.

20. The method of claim 16, wherein the detecting the image data of the user is while the user is exercising on a fitness machine.

21. The method of claim 20, wherein the fitness machine includes a treadmill, and wherein determining the exercise performance condition comprises determining one or more of a gait form of the user, a stride length of the user, a gait pace of the user, or muscle tension of the user.

22. The method of claim 16, further comprising causing display of an image of a reference user having an ideal exercise form.

23. The method of claim 22, further comprising overlaying the avatar of the user on top of the image of the reference user.

24. The method of claim 16, wherein the providing the evaluation or the instruction comprises causing display of a text-based message of the evaluation or the instruction.

25. The method of claim 16, further comprising:
providing the instruction as an instruction to correct a body form of the user;
determining, from analysis of additional image data detected by the camera-based sensor, that the user has failed to correct the body form after a lapse of a predetermined period of time from the providing the instruction;
determining that a current workout routine can be modified; and
modifying the current workout routine to initiate a new workout routine.

26. A system comprising:
at least one camera-based sensor to detect image data of a user during exercise;
a display;
one or more processors; and
one or more memories storing instructions that, when executed by the one or more processors, perform operations comprising:
analyzing the image data detected by the at least one camera-based sensor;
determining an exercise performance condition of the user based at least in part on analysis of the image data;
providing, on the display:
an avatar of the user; and
an evaluation of the exercise performance condition or an instruction to take corrective action by color coding a portion of the avatar that corresponds to portion of the user's body relating to the exercise performance condition.

27. The system of claim 26, further comprising a treadmill, wherein the exercise performance condition comprises one or more of a gait form of the user, a stride length of the user, a gait pace of the user, or muscle tension of the user.

* * * * *